(12) United States Patent
Sugimoto et al.

(10) Patent No.: US 8,697,300 B2
(45) Date of Patent: Apr. 15, 2014

(54) FUEL CELL, AND METHOD FOR MANUFACTURING THE SAME

(75) Inventors: Masakazu Sugimoto, Kyoto (JP); Masaya Yano, Kyoto (JP); Hitoshi Ishizaka, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 669 days.

(21) Appl. No.: 12/935,369

(22) PCT Filed: Mar. 18, 2009

(86) PCT No.: PCT/JP2009/055298
§ 371 (c)(1),
(2), (4) Date: Sep. 29, 2010

(87) PCT Pub. No.: WO2009/122910
PCT Pub. Date: Aug. 10, 2009

(65) Prior Publication Data
US 2011/0027667 A1 Feb. 3, 2011

(30) Foreign Application Priority Data

Mar. 31, 2008 (JP) ................. 2008-090592
Jun. 19, 2008 (JP) ................. 2008-160821

(51) Int. Cl.
*H01M 8/18* (2006.01)
*H01M 8/06* (2006.01)
*H01M 8/24* (2006.01)
*H01M 2/38* (2006.01)
*H01M 2/40* (2006.01)

(52) U.S. Cl.
USPC ............ 429/417; 429/416; 429/452; 429/462

(58) Field of Classification Search
USPC ................ 429/400, 408, 452, 417, 416, 462; 422/129
See application file for complete search history.

(56) References Cited

U.S. PATENT DOCUMENTS 4,155,712 A * 5/1979 Taschek .................. 422/239
5,547,777 A * 8/1996 Richards .................. 429/437
(Continued)

FOREIGN PATENT DOCUMENTS

JP 58-176876 A 10/1983
JP 6-084537 A 3/1994
(Continued)

OTHER PUBLICATIONS

Halseid, Rune, et al., Effect of ammonia on the performance of polymer electrolyte membrane fuel cells, Journal of Power Sources, Mar. 21, 2006, pp. 343-350, vol. 154, Issue 2, Elsevier SA, CH.

(Continued)

*Primary Examiner* — Patrick Ryan
*Assistant Examiner* — Julian Anthony
(74) *Attorney, Agent, or Firm* — Knobbe Martens Olson & Bear LLP

(57) ABSTRACT

A fuel cell of the present invention comprises a power generating cell (C), which has at least two surfaces, a fuel gas being supplied through one of the surfaces and oxygen being supplied through the other surface, thereby generating electric power, a cell holder (6) that holds the power generating cell (c) to face the one of the surfaces inward, whereby forming an inner space together with the power generating cell (C), and a fuel generating section (B) that is arranged in the inner space of the cell holder (6) and generates the fuel gas.

6 Claims, 18 Drawing Sheets

(56) References Cited

U.S. PATENT DOCUMENTS

| | | | |
|---|---|---|---|
| 6,274,093 B1 * | 8/2001 | Long et al. | 422/129 |
| 7,544,435 B2 * | 6/2009 | Davis | 429/421 |
| 7,618,600 B1 * | 11/2009 | Luo et al. | 422/211 |
| 2003/0180594 A1 | 9/2003 | Choi | |
| 2004/0151966 A1 | 8/2004 | Dahlgren et al. | |
| 2007/0065712 A1 | 3/2007 | Wada et al. | |
| 2007/0124989 A1 | 6/2007 | Eickhoff et al. | |
| 2007/0243447 A1 | 10/2007 | Jang et al. | |
| 2009/0049749 A1 * | 2/2009 | Miki et al. | 48/62 R |
| 2009/0214904 A1 | 8/2009 | Zhou | |

FOREIGN PATENT DOCUMENTS

| | | |
|---|---|---|
| JP | 6-223845 A | 8/1994 |
| JP | 7-130381 A | 5/1995 |
| JP | 8-273693 A | 10/1996 |
| JP | 2002-25592 A | 1/2002 |
| JP | 2002-198064 A | 7/2002 |
| JP | 2003-031247 | 1/2003 |
| JP | 2003-132926 A | 5/2003 |
| JP | 2003-282131 A | 10/2003 |
| JP | 2004-265739 A | 9/2004 |
| JP | 2005-11624 A | 1/2005 |
| JP | 2005-222877 A | 8/2005 |
| JP | 3114148 U | 8/2005 |
| JP | 2005-327638 A | 11/2005 |
| JP | 2006-66339 A | 3/2006 |
| JP | 2006-172972 A | 6/2006 |
| JP | 2006-228724 A | 8/2006 |
| JP | 2006-351501 A | 12/2006 |
| JP | 2007 123163 | 5/2007 |
| JP | 2007-134215 A | 5/2007 |
| JP | 2007 161520 | 6/2007 |
| JP | 2007-200665 A | 8/2007 |
| JP | 2007-250211 A | 9/2007 |
| JP | 2008-117716 A | 5/2008 |
| JP | 3142115 U | 5/2008 |
| WO | WO 2006/113469 A1 | 10/2006 |

OTHER PUBLICATIONS

Search Report dated Jan. 24, 2013 in corresponding European Application No. 09729150.4.

Office Action dated Oct. 29, 2012 in corresponding Japanese Patent Application No. 2010-505573.

Office Action dated Oct. 10, 2012 in corresponding Chinese Patent Application No. 200980106214.4.

Office Action issued May 24, 2013 in corresponding Chinese Application No. 20098016214.4.

Office Action issued Nov. 22, 2013 in corresponding Chinese Application No. 200980106214.4.

* cited by examiner

Fig.10
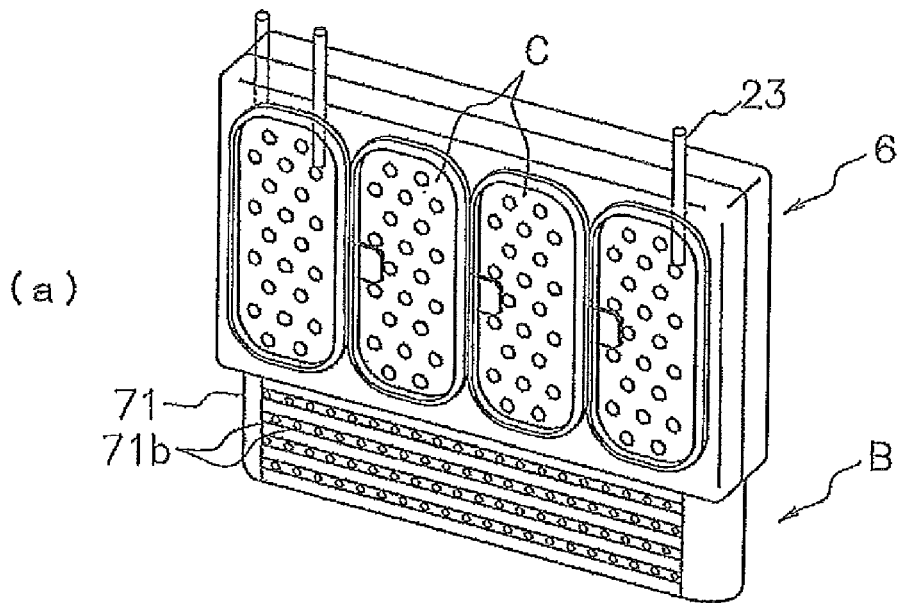
(a)
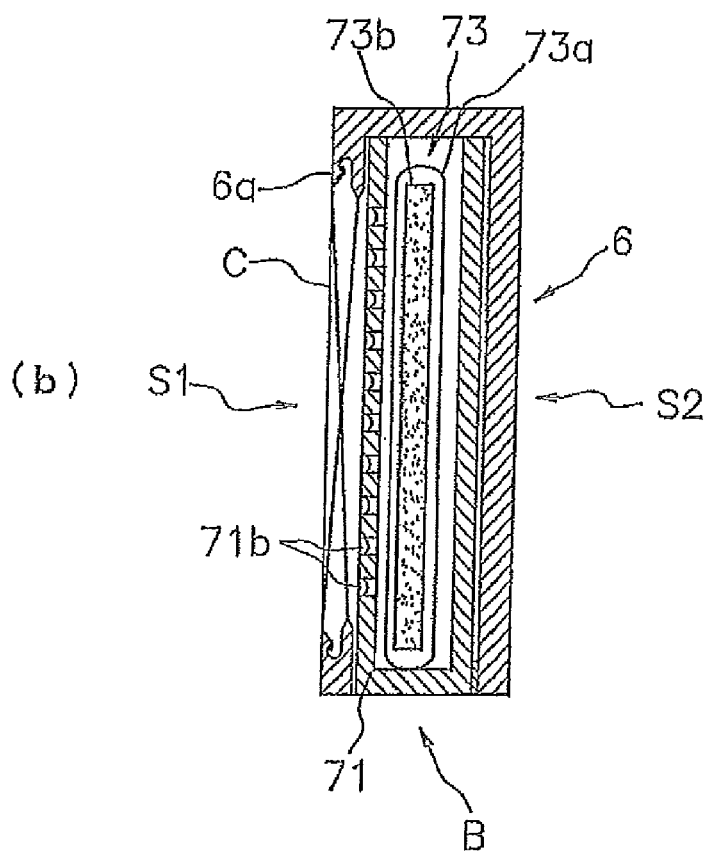
(b)

Fig.14
(a) 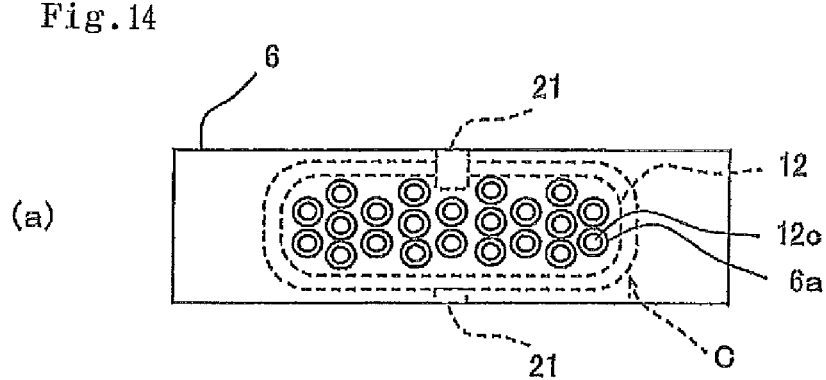
(b) 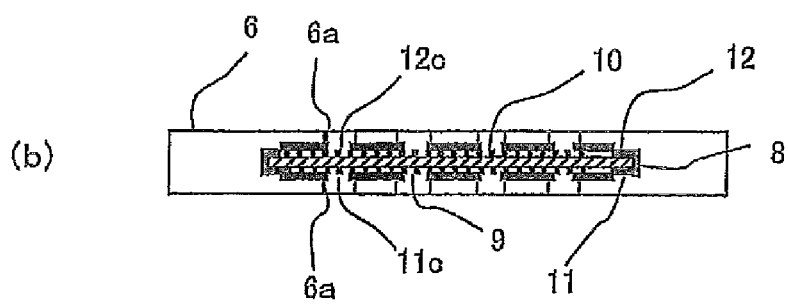

Fig. 16
(a) 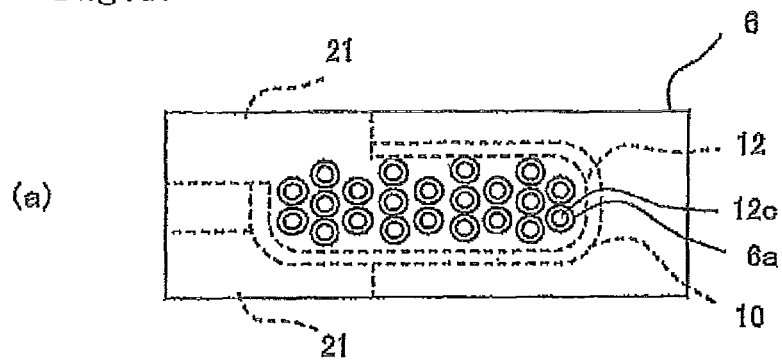
(b) 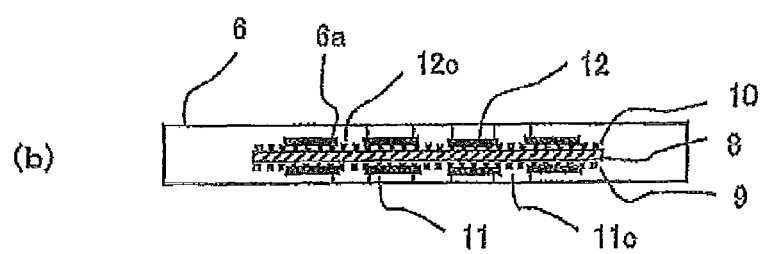
(c) 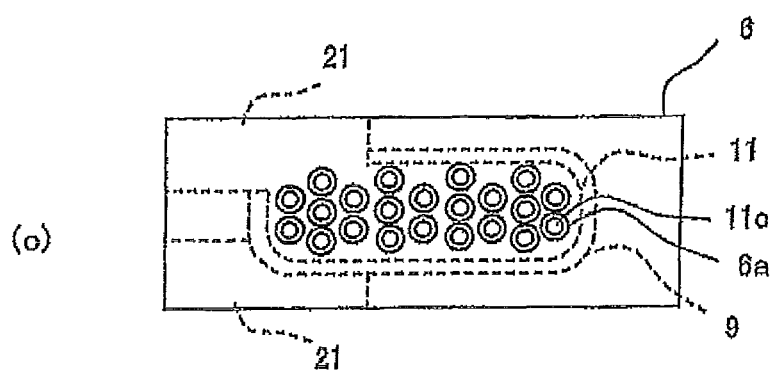

Fig. 17
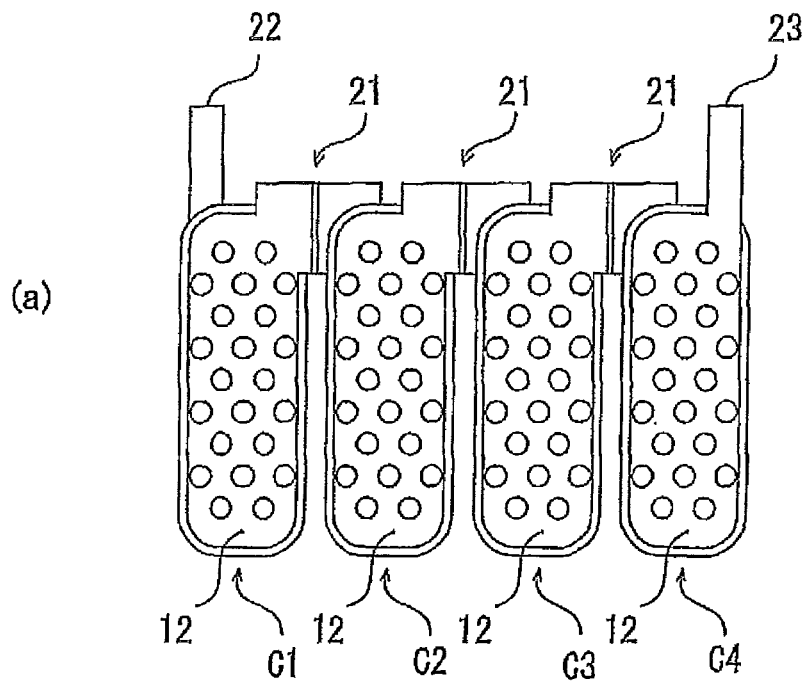
(a)
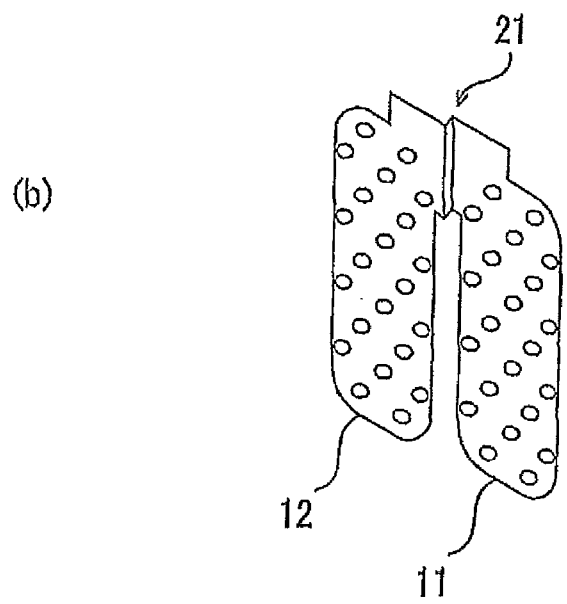
(b)

FUEL CELL, AND METHOD FOR MANUFACTURING THE SAME

This application is the U.S. National Phase under 35. U.S.C. §371 of International Application PCT/JP2009/055298, filed Mar. 18, 2009, which claims priority to Japanese Patent Application No. 2008-090592, filed Mar. 31, 2008 and Japanese Patent Application No. 2008-160821, filed Jun. 19, 2008. The International Application was published under PCT Article 21(2) in a language other than English.

TECHNICAL FIELD

The present invention relates to a fuel cell equipped with a power generating cell, a cell holder for holding this power generating cell, a fuel generating section and others; and a method for manufacturing the fuel cell. The invention is useful, in particular, as a fuel cell used in a mobile instrument (portable instrument) or the like.

BACKGROUND ART

With development in IT in recent years, lithium ion secondary cells are used as power sources for almost all mobile instruments such as portable telephones, notebook-size personal computers, and digital camera. However, with an improvement in the performances of these mobile instruments, the power consumptions thereof tend to become increasingly large. Attention has been paid to fuel cells, which are clean and high in efficiency, for power sources or for charging the instruments.

When a fuel cell is used, in particular, in a portable instrument such as a notebook-size personal computer or a portable telephone, it is desired that the fuel cell has a structure capable of maintaining the portability thereof, or the smallness of the size thereof. It is therefore necessary for forming a fuel cell that its individual sections, such as its power generating cell and its fuel gas generating section, are effectively arranged.

A fuel cell made portable or small in size is known in Patent Document 1 described below by the present Japanese Patent Applicant. This fuel cell is equipped with: a cell body case composed of wall surface portions which constitute the external form of the cell body and at least face toward different directions; a supporting substrate arranged along the wall surface portions; unit cells (power generating cells) for power generation that are mounted on the supporting substrate; and a fuel gas generating section for generating a fuel gas, such as hydrogen gas, to be supplied to the power generating cells.

In this fuel cell, the unit cells each have a fuel gas channel, and the fuel gas channels of the unit cells are connected to each other through pipes. The document also discloses that a fuel gas generating unit is arranged in an inner space of the cell body case.

However, in a structure wherein a plurality of unit cells are connected to each other through pipes, as seen in the above-mentioned fuel cell, spaces for the pipes are wasteful. Thus, a limit is given onto technique for making such a fuel cell smaller. Additionally, the fuel gas generating unit is made of an independent structure; it is therefore necessary to use a package therefor, or a pipe for supplying the gas, so as to result also in a problem that a space for receiving a fuel gas generating agent decreases.

In the meantime, Patent Document 2 described below discloses a fuel cell having a structure wherein at the time of forming a structure composed of unit cells stacked on each other, a fuel gas can be supplied to power collector (electrode) surfaces of the unit cells through porous plates. About this fuel cell, a fuel gas supplying source is arranged outside the cell. The source is connected through a pipe or the like to a fuel supplying section in the form of an oblate box having, on the front and rear sides thereof, porous plates, respectively.

Patent Document 1: Japanese Registered Utility Model No. 3114148

Patent Document 2: JP-A-2003-282131

DISCLOSURE OF THE INVENTION

Problems to be Solved by the Invention

However, the fuel cell in Patent Document 2 is a structure composed of unit cells stacked on each other, so that no fuel gas supplying source can be set inside the structure. Moreover, a plurality of fuel supplying sections as described above, which are each in the form of an oblate box, are required, so that a plurality of pipes to be connected to these sections are also required. Also from the viewpoint of the space for the pipes, therefore, a limit is given onto technique for making the whole smaller.

Thus, an object of the present invention is to make spaces for pipes, and others as small as possible, thereby providing a fuel cell that can be made smaller, and a method for manufacturing the fuel cell.

Means for Solving the Problems

The above-described object can be attained according to the following present invention.

A fuel cell of the present invention comprises a power generating cell, which has at least two surfaces, a fuel gas being supplied through one of the surfaces and oxygen being supplied through the other surface, thereby generating electric power, a cell holder that holds the power generating cell to face the one of the surfaces inward, whereby forming an inner space together with the power generating cell, and a fuel generating section that is arranged in the inner space of the cell holder and generates the fuel gas.

According to the fuel cell of the present invention, the fuel gas generated in the fuel generating section is emitted into the inner space of the cell holder, so as to be supplied to the power generating cell through one of the surfaces of the cell while oxygen in the air is supplied thereto through the other surface. Thus, electric power can be generated without using any pipe in the power generating cell or any pipe from the fuel generating section. Moreover, space-saving can be attained since the fuel generating section can be arranged in the inner space. As a result, a fuel cell can be supplied which can be made smaller in size by making a piping space and others as small as possible.

A fuel cell of the present invention comprises a plurality of power generating cells, which each have at least two surfaces, a fuel gas being supplied through one of the surfaces and oxygen being supplied through the other surface, thereby generating electric power, a cell holder that holds each of the plurality of power generating cells to face its one of the surfaces inward, whereby forming an inner space together with the plurality of power generating cells, and a fuel generating section that is arranged in the inner space of the cell holder and generates the fuel gas.

According to this fuel cell, the fuel gas generated in the fuel cell generating section is emitted into the inner space of the cell holder, so as to be supplied to each of the power generating cells through one of the surfaces of the cell while oxygen in the air is supplied thereto through the other surface.

Thus, electric power can be generated without using any pipe between the power generating cells or a pipe from the fuel generating section. Moreover, space-saving can be attained since the fuel generating section can be arranged in the inner space. As a result, a fuel cell can be supplied which can be made smaller in size by making a piping space and others as small as possible.

In the description above, it is preferred that the fuel generating section stores a gas generating agent that is reactive with a reaction liquid to generate the fuel gas. By the use of the gas generating agent, the fuel generating section can be made smaller in size, so that the whole can be made small in size. It is particularly preferred that the fuel generating section stores a hydrogen generating agent that is reactive with a reaction liquid containing water to generate hydrogen gas.

In the description above, it is preferred that in the fuel generating section, the hydrogen generating agent is stored in a container having a porous cylindrical side wall to interpose a hydrophobic porous membrane between the container and the agent. The hydrophobic porous membrane has a property that water does not permeate easily through the membrane and hydrogen gas permeates through the membrane. Thus, when the container stores the hydrogen generating agent to interpose the hydrophobic porous membrane between the container and the agent, the power generating cell(s) cannot be prevented from being deteriorated by a scattering of water.

In the description above, it is preferred that when the container of the fuel generating section is arranged in the inner space of the cell holder, the container can be removably disposed in the space and taken off from the space. According to this structure, the container of the fuel generating section can be exchanged, thereby exchanging the hydrogen generating agent. In such a manner, new power generations can be successively attained.

In the description above, it is preferred that in the state that the power generating cells are electrically connected to each other, the cells are integrated with the cell holder by insert molding. In the present invention, no pipe is required between the power generating cells, so that the insert molding can be attained in the state that the cells are electrically connected to each other. In this way, the power generating cells and the cell holder are integrated with each other so that the inner space of the cell holder can be formed by a simple production process.

In the description above, it is preferred that about the power generating cell, constituting members thereof are integrated with the cell holder by insert molding. Moreover, it is preferred that the constituting members are a plate-form solid polymer electrolyte, an anode side electrode plate arranged on one of both sides of the solid polymer electrolyte, a cathode side electrode plate arranged on the other side, an anode side metallic plate arranged outside the anode side electrode plate, and a cathode side metallic plate arranged outside the cathode side electrode plate, and these members being laminated onto each other.

Moreover, it is preferred that the cell holder forms a cylindrical side wall together with the power generating cells, and the power generating cells are arranged on the circumference of the cylindrical side wall. This makes it possible to a columnar fuel cell the circumference of which is surrounded by the power generating cells.

It is preferred that the cell holder forms a flat boxy body together with the power generating cell(s), which has at least two opposing surfaces, and the power generating cells are arranged on one or both surfaces of the opposing surfaces of the boxy body. This makes it possible to form a fuel cell having a flat shape, wherein the power generating cells are arranged on the same plane. The fuel cell is particularly advantageous when the fuel cell is set into an instrument for supplying electric power.

On the other hand, a method for manufacturing a fuel cell of the present invention comprises each power generating cell having air being supplied through an opening of a cathode side surface and a fuel being supplied to the anode side, thereby generating electric power; and a cell holder that holds the power generating cell and forms an inner space in which a fuel generating section that generates a fuel gas is arranged together with the power generating cell; wherein the method comprising a step of arranging the power generating cell or constituting members thereof in a mold in the state that at least the opening in the surface is stuffed with a convex portion of the mold; and a step of injecting a resin into the mold to form the cell holder.

According to the fuel cell manufacturing method of the present invention, the power generating cells, which are electrically connected to each other, or the constituting members thereof are arranged in the mold, and then a resin is injected into the mold to attain the formation of the cell holder. Therefore, through the simple step, the power generating cells can be integrated with the cell holder. Moreover, in the state that the opening in the cathode side surface is stuffed with the convex portion of the mold, the power generating cells are arranged in the mold; thus, when the resin is injected into the mold, it is possible to prevent the invasion of the resin into the opening, to which air necessary for power generation is supplied, and further seal portions unnecessary for the power generation with the resin.

BRIEF DESCRIPTION OF THE DRAWINGS

FIG. 10 Figures are a perspective view (a) and a vertical sectional view (b) of a fuel cell (second embodiment).

FIG. 14 Figures are a top view (a) illustrating an example of a fuel cell (third embodiment), and a sectional view thereof (b) when the fuel cell is viewed from the front.

FIG. 16 Figures are a top view (a) illustrating an example of a fuel cell (fourth embodiment), a sectional view thereof (b) when the fuel cell is viewed from the front, and a bottom view thereof (c).

FIG. 17 Figures are views illustrating a manner that four power generating cells are connected (fourth embodiment).

REFERENCE NUMERALS

Figure 1:
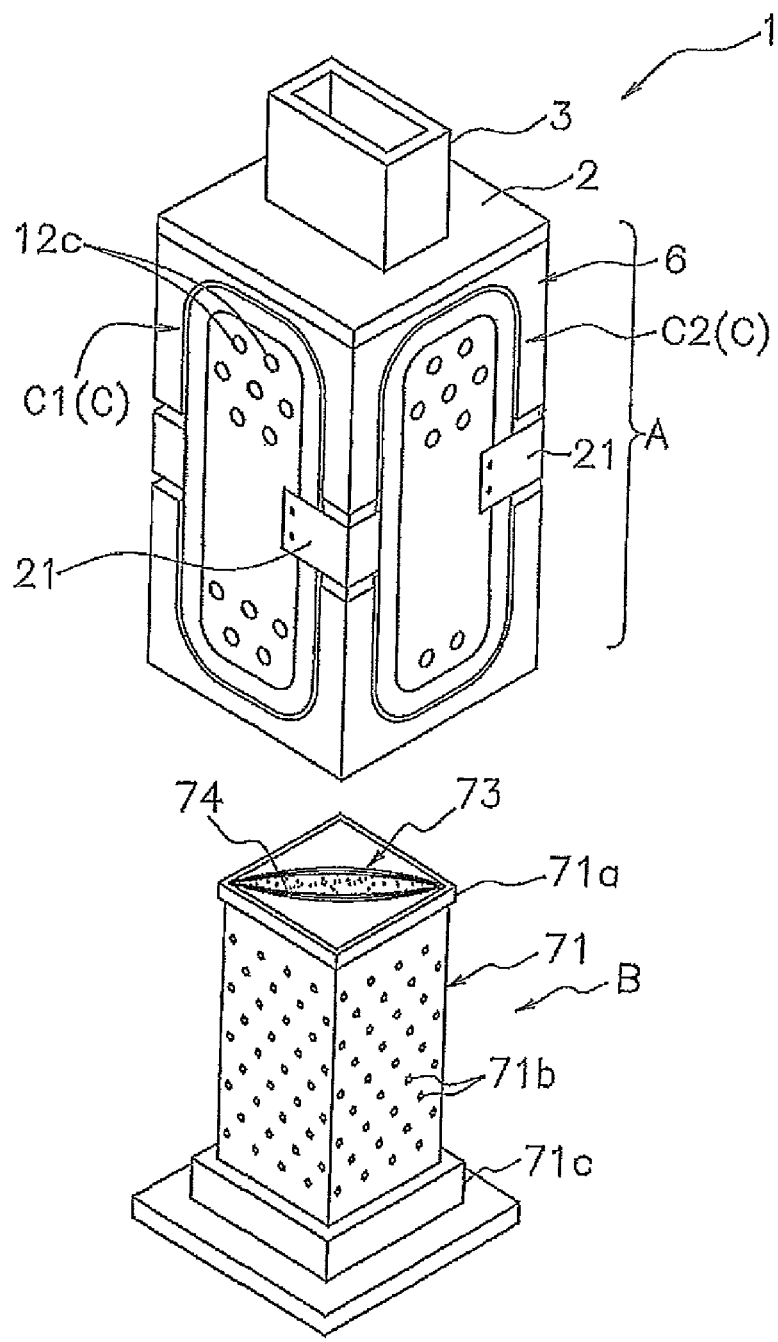
FIG. 1 Figures are each an external appearance perspective view illustrating a fuel cell (first embodiment).

A power generating cell holder
B fuel gas generating section
B1 water storing section
B fuel generating section
C, C1, C2, C3 and C4 power generating cell(s)
1 fuel cell
6 cell holder
46 hydrogen generating agent
71 container
72 hydrophobic porous membrane
73 sheet-form hydrogen generator

BEST MODE FOR CARRYING OUT THE INVENTION

Referring to the drawings, preferred embodiments of the fuel cell according to the present invention will be described. FIG. 1 is an exploded perspective view illustrating main portions of a fuel cell of the invention.

First Embodiment

<Structure of the Whole of the Fuel Cell>

As illustrated in FIG. 1, the fuel cell 1 of the present invention has a plurality of power generating cells C, a cell holder 6, and a fuel generating section B. The fuel cell 1 can be functionally classified roughly to a power generating cell holding section A and the fuel generating section B.

The power generating cell holding section A holds power generating cells C1 to C4 that each receive the supply of hydrogen gas, which is a fuel gas, to generate electric power (when the individual power generating cells do not need to be distinguished from each other, the cells are denoted by power generating cells C). In the present embodiment, shown is an example wherein the four power generating cells C are held by the cell holder 6 to form an inner space. A substrate 2 is fitted to one of the end surfaces of the cell holder 6. To this substrate 2 is attached an electric power supply terminal 3. The electric power supply terminal 3 may be a USB terminal or the like. However, the terminal 3 is not limited thereto.

The fuel generating section B has a function of generating hydrogen gas as a fuel gas to be supplied to the power generating cells C. The fuel generating section B may have a water storing section (corresponding to a reaction liquid storing section for storing water, which is a reaction liquid).

A reaction liquid is beforehand supplied to the fuel generating section B, or a reaction liquid is supplied from the water storing section thereto, so that hydrogen gas is generated by chemical reaction between the liquid and a hydrogen generating agent or the like. The generated hydrogen gas is supplied to the individual power generating cells C in the power generating cell holding section A.

As illustrated in FIG. 1, in the embodiment, the power generating cell holding section A is made into the form of a cylindrical square pole. The cell holder 6 is combined with the power generating cells C1 to C4 to constitute side walls in a cylindrical form. The power generating cells C1 to C4 are arranged onto the circumferences of the cylindrical side walls. The fuel generating section B is arranged to be inserted into the inner space of the power generating cell holding section A. As described herein, the fuel cell illustrated in FIG. 1 is in a stick form as a whole. Thus, the downsizing of the fuel cell can be realized.

The hydrogen generating agent and others in the fuel generating section B are consumable supplies. Thus, it is preferred that the fuel generating section B is formed to be removably disposed in the cell holder 6 and taking off therefrom. The structure for putting the section B removably into the holder and taking off therefrom may be a known structure, such as a fitting, engaging or screwing structure.

The main portions of the fuel cell 1 have been shown in FIG. 1; it is preferred that an external appearance member is arranged to cover the circumference thereof. On the supposition that the upper and lower in FIG. 1 are the upper and the lower of the fuel cell 1 for the sake of convenience, a description will be made; however, the state does not represent a state in a situation that the fuel cell 1 is actually used.

<Structure of the Power Generating Cell>

Figure 2:
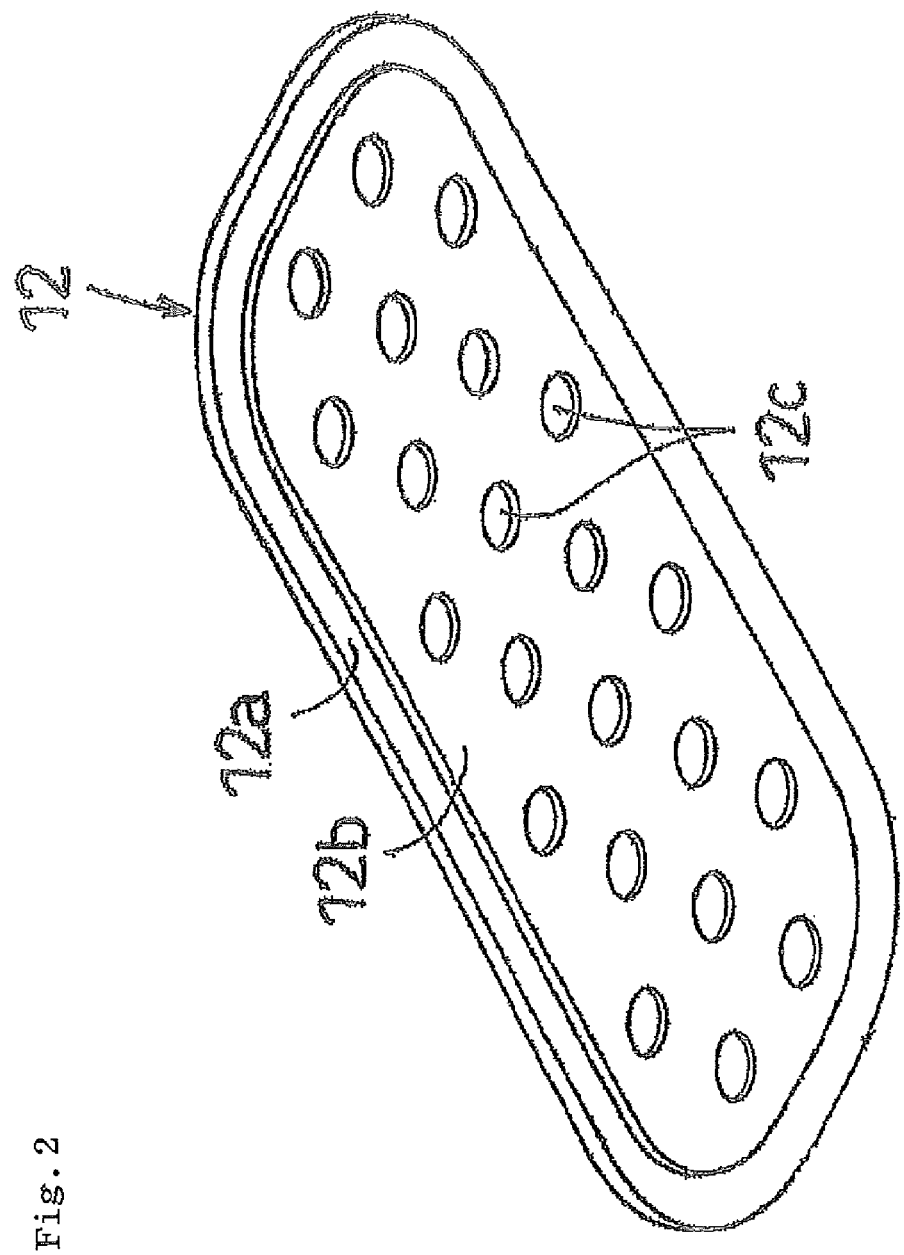
FIG. 2 is a cathode side perspective view illustrating a structural example of a power generating cell.
Figure 3:
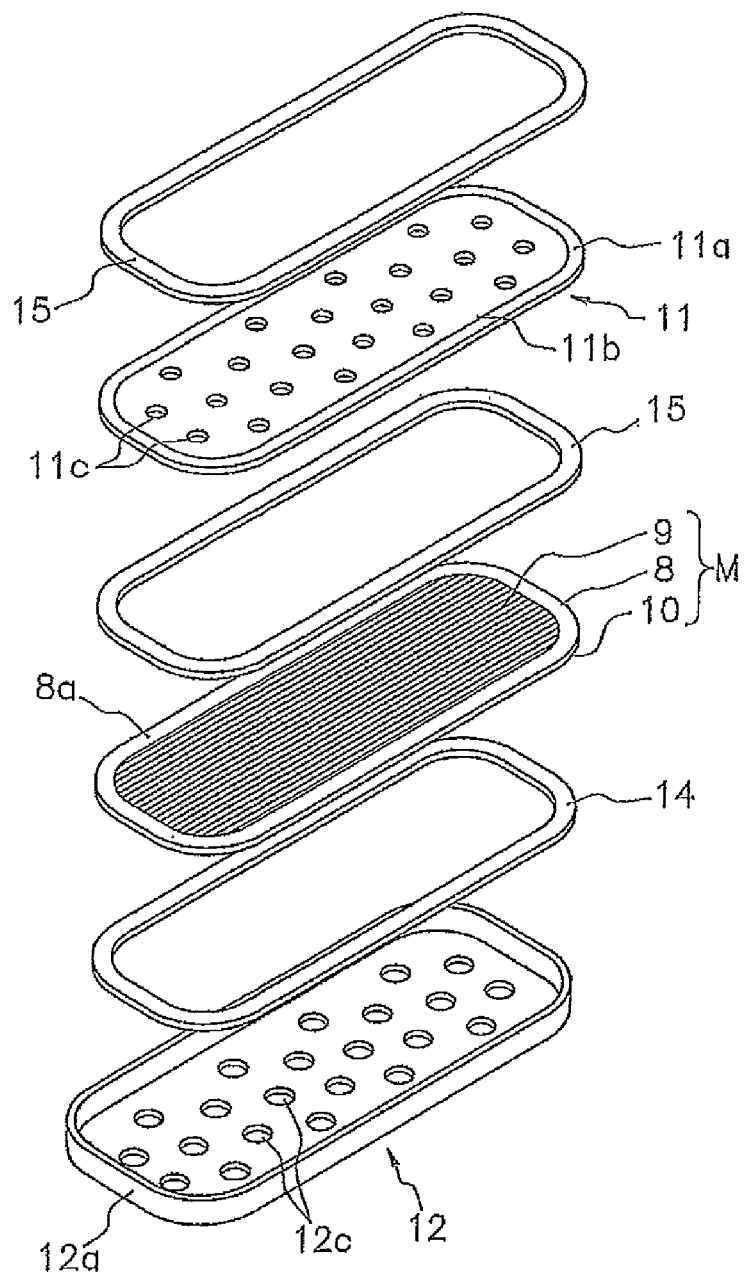
FIG. 3 is an exploded perspective view of the structure of the power generating cell.
Figure 4:
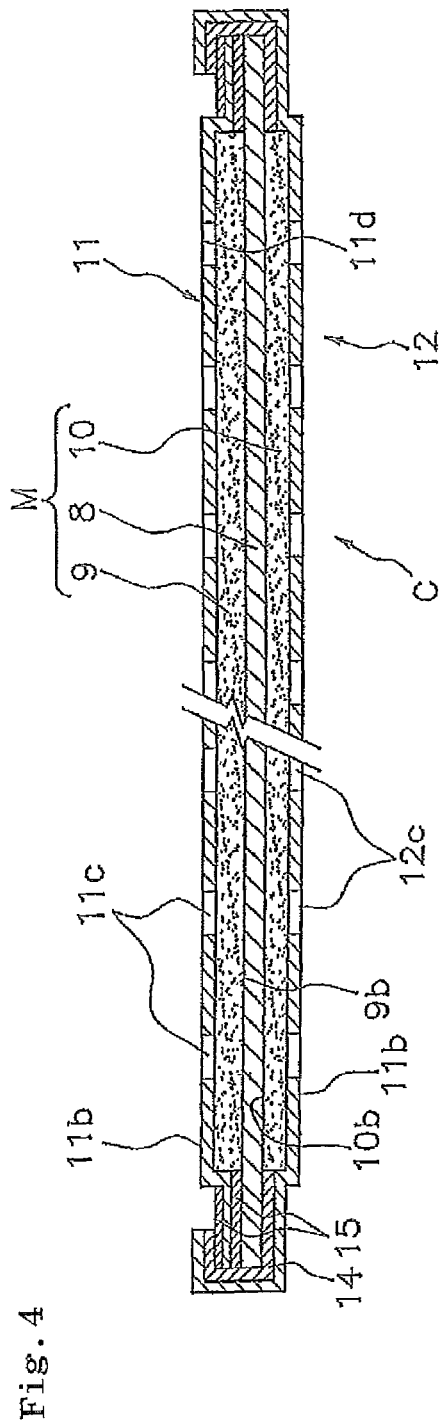
FIG. 4 is a sectional view illustrating the internal structure of the power generating cell.

Referring to the drawings, the power generating cells C according to the present invention will be described. FIG. 2 is a perspective view of the external appearance of any one of the power generating cells when the cell is viewed from the cathode side thereof. A perspective view of the external appearance when the cell is viewed from the anode side is also substantially equal thereto. FIG. 3 is an exploded perspective view illustrating the internal structure of the power generating cell, and FIG. 4 is a vertical sectional view of the power generating cell.

In any one of the power generating cells C of the present invention, a fuel gas is supplied thereto through one of its surfaces, and oxygen is supplied thereto through the other surface, thereby generating electric power. As illustrated in FIGS. 2 to 4, in the embodiment, the power generating cell C has a solid polymer electrolyte 8 in a plate form, an anode side electrode plate 9 arranged on one of both sides of the solid polymer electrolyte 8, and a cathode side electrode plate 10 arranged on the other side. The solid polymer electrolyte 8 is sandwiched between the paired electrode plates 9 and 10. Furthermore, an anode side metallic plate 11 is arranged outside the anode side electrode plate 9, and a cathode side metallic plate 12 is arranged outside the cathode side electrode plate 10.

Respective circumferential edge regions 11a and 12a of the metallic plates 11 and 12 are fastened onto each other to be sealed with each other after the solid polymer electrolyte 8 and the electrode plates 9 and 10 are held therebetween. For the convenience of the description, regions of the metallic plates 11 and 12 other than the circumferential edge regions 11a and 12a thereof will be referred as central regions 11b and 12b. As illustrated in FIG. 3, before the fastening work is conducted, the circumferential edge region 12a of the cathode side metallic plate 12 is in the state of a perpendicularly-bent rising region. When this is pushed down inwards, the circumferential edge region 12a is put onto the circumferential edge region 11a of the anode side metallic plate 11 so that the sealing can be attained. This perpendicularly-bent rising region may be formed by reducing work.

The solid polymer electrolyte 8 may be any solid polymer electrolyte as far as the electrolyte is usable in a solid polymer membrane type cell in the prior art. From the viewpoint of chemical stability and electroconductivity, it is preferred to use a cation exchange membrane made of a perfluorocarbon polymer having a sulfonic acid group, which is a superacid. The cation exchange membrane is preferably a NAFION (registered trade name). Other examples thereof include a product wherein a porous membrane made of a fluorine-contained resin, such as polytetrafluoroethylene, is impregnated with the NAFION or some other ion conductive material, and a product wherein the NAFION or some other ion conductive material is carried on a porous membrane or non-woven cloth made of a polyolefin resin, such as polyethylene or polypropylene.

It is more effective for making the whole thinner to make the thickness of the solid polymer electrolyte 8 smaller. Considering the ion conducting function, strength and handleability thereof, and others, the thickness is preferably from 25 to 50 μm although a thickness of 10 to 300 μm is usable.

The electrode plates 9 and 10 may be layers which each function as a gas diffusion layer to supply and discharge a fuel gas, an oxidizing gas and water vapor, and simultaneously each exhibit a power collecting function. The electrode plates 9 and 10 may be the same layers or different layers. It is preferred to carry, onto base materials or base members thereof, a catalyst having an electrode catalyst effect. It is preferred to carry the catalyst at least onto inner surfaces 9b and 10b which contact the solid polymer electrolyte 8.

The electrode base materials of the electrode plates 9 and 10 may each be, for example, carbon paper, a fibrous carbon such as carbon fiber nonwoven cloth, an electroconductive-polymeric-fiber-collected body, or some other electroconductive porous material. In general, the electrode plates 9 and 10 are each produced by adding, to such an electroconductive porous material, a water repellant material such as fluorine-contained resin. When the catalyst is carried thereon, the electrode plates 9 and 10 are each formed by mixing the catalyst such as finely particulate platinum with the water repellant material such as fluorine-contained resin, incorporating a solvent into this mixture to make the mixture into a paste or ink form, and then painting the resultant onto a single surface of one of the electrode base members which should be opposed to the solid polymer electrolyte film.

In general, the electrode plates 9 and 10, and the solid polymer electrolyte 8 are designed to be matched with a reducing gas and an oxidizing gas to be supplied to the fuel cell. In the present invention, it is preferred to use air as the oxidizing gas and use hydrogen gas as the reducing gas.

In the case of using, for example, hydrogen gas and air, a reaction is caused between oxygen and hydrogen ions in the cathode side electrode plate 10, which is a naturally air-supplied side. As a result, water is produced. It is therefore preferred that a design is made so as to be matched with this electrode reaction. In particular, under driving conditions of a low operating temperature, a high current density and a high gas utilization rate, there is easily caused a flooding phenomenon of the electrode porous body based on the condensation of water vapor, in particular, in the air electrode, where water is produced. Accordingly, in order to gain stable characteristics of the fuel cell over a long term, it is effective to keep the water repellency of the electrodes certainly not to cause the flooding phenomenon.

The catalyst may be at least one selected from platinum, palladium, ruthenium, rhodium, silver, nickel, iron, copper, cobalt and molybdenum, or may be any oxide thereof. It is allowable to use a product wherein the catalyst is beforehand carried on carbon black or the like.

It is more effective for making the whole thinner to make the thickness of the electrode plates 9 and 10 smaller. Considering the electrode reaction, the strength and handleability thereof, and others, the thickness is preferably from 50 to 500 μm. The electrode plates 9 and 10 may be beforehand laminated onto the solid polymer electrolyte 8 so as to be integrated with each other by bonding, melt-bonding, or the like. However, these may be arranged to be merely laminated onto each other. The laminated body is available also as a membrane electrode assembly (MEA) M. This may be used.

The anode side metallic plate 11 is arranged on the surface of the anode side electrode plate 9, and the cathode side metallic plate 12 is arranged on the surface of the cathode side electrode plate 10. In the anode side metallic plate 11 are made openings 11c for supplying hydrogen gas which is a fuel gas to the anode side electrode plate 9. About the openings 11c, the number, the shape and the size thereof, positions where the openings 11c are made, and others are not limited as far as the openings 11c make it possible to make the anode side electrode plate 9 uncovered. About the openings 11c in the anode side metallic plate 11, for example, a plurality of circular holes, slits or the like may be made regularly or at random. Alternatively, it is allowable to make the openings 11c by use of a metallic mesh. The percentage of the area of the openings 11c portions (opening percentage) is preferably from 10 to 40% from the viewpoint of the balance between the contact area with the electrode and the gas-supplying area.

In the cathode side metallic plate 12 are made a large number of openings 12c for supplying oxygen in the air to the cathode side electrode plate 10 (natural air intake). About the openings 12c, the number, the shape and the size thereof, positions where the openings 12c are made, and others are not limited as far as the openings 12c make it possible to make the cathode side electrode plate 10 uncovered. About the openings 12c in the cathode side metallic plate 12, for example, a plurality of circular holes, slits or the like may be made regularly or at random. Alternatively, it is allowable to make the openings 12c by use of a metallic mesh. The percentage of the area of the opening 12c portions (opening percentage) is preferably from 10 to 40% from the viewpoint of the balance between the contact area with the electrode and the gas-supplying area.

Without using the anode side metallic plate 11, wherein the openings 11c are made, nor the cathode side metallic plate 12, wherein the openings 12c are made, the power generating cells may be held by the cell holder 6 to make the anode side electrode plate 9 and the cathode side electrode plate 10 uncovered. In the case, it is allowable to make a plurality of openings in the cell holder 6 and make the anode side electrode plate 9 and the cathode side electrode plate 10 naked from the openings.

For the metallic plates 11 and 12, any metal may be used as far as the metal does not produce any bad effect onto the electrode reactions. Examples thereof include a stainless steel plate, nickel, copper, and copper alloys. A stainless steel plate and nickel are preferred from the viewpoint of the elongation, the weight, the elasticity, the strength, the corrosion resistance, the press workability and the etching workability thereof, and others.

It is more effective for making the whole thinner to make the thickness of the metallic plates 11 and 12 smaller. Considering the strength, the elongation, the weight, the elasticity and the handleability, and others, the thickness is preferably from 0.1 to 1 mm.

The making of the openings 12c and 11c in the metallic plates 12 and 11 is also attained by use of press working (press punching work). Furthermore, the same press working (punching working) is used to make concave portions in the central regions 11b and 12b, respectively. As illustrated in FIG. 4, the concave portions are concave portions for receiving the electrode plates 9 and 10, which constitute a membrane electrode assembly M. Accordingly, the areas of the concave portions are worked in accordance with the sizes of the electrode plates 9 and 10 to be received, respectively.

In the present invention, the circumferential edge regions 11a and 12a of the metallic plates 11 and 12 are fastened onto each other so as to be sealed with each other in the state that these regions are electrically insulated from each other. The electrical insulating is attained by use of an insulating sheet. However, the insulating may be attained by interposing a circumferential edge region 8a of the solid polymer electrolyte 8 therebetween.

As illustrated in FIG. 3, about the cathode side metallic plate 12, an insulating sheet 14 in the form of a ring (picture frame) is arranged onto the circumferential edge region 12a. The outer edge of the insulating sheet 14 is set to have a size substantially equal to the size of the edge of the metallic plate 12. The inner edge thereof is set to have a size somewhat larger than the size of the region where the many openings 12c are made (or a size somewhat larger than the size of the electrode plate 10). The insulating sheet 14 is beforehand attached onto the circumferential edge region 12a of the metallic plate 12, and in this state the metallic plate 12 is worked to cause the circumferential edge region 12a to be perpendicularly bent and raised.

As illustrated in FIG. 3, about the anode side metallic plate 11 also, insulating sheets 15 in the form of a ring (picture frame) are arranged onto the outer and inner surfaces of the circumferential edge region 11a, respectively. The sizes of the insulating sheets 15 on the outer and inner surfaces are equal to each other. The outer edges of the insulating sheets 15 are each set to have a size substantially equal to the size of the edge of the metallic plate 11, and the inner edges thereof are each set to have a size somewhat larger than the size of the electrode plate 9. The insulating sheets 15 may also be beforehand attached onto the metallic plate 11.

The solid polymer electrolyte 8 is somewhat larger than the sizes of the electrode plates 9 and 10. As illustrated in FIG. 4, the members 8 to 9 are assembled in such a manner that the circumferential edge region 8a thereof, which is in the state of being naked from the electrode plates 9 and 10, is sandwiched between the insulating sheet 14 and one of the insulating sheets 15.

In other words, when the sealing by the fastening is performed in the present invention, the circumferential edge region 8a of the solid polymer electrolyte 8, which is present outside of the electrode plates 9 and 10, is made into the state that the region 8a is sandwiched between the circumferential edge regions 11a and 12a to interpose the insulating sheet 14 and one of the insulating sheets 15 (into the respective interfaces). According to the structure, any gas and others can be effectively prevented from flowing from one of the electrode plates 9 and 10 to the other. The other of the insulating sheets 15 is laid also onto the outer surface side of the metallic plate 11. When the sealing by the fastening is performed, the sealing can be attained in the state that the insulating performance is certainly kept.

The insulating sheets 14 and 15 may each be a sheet-form resin, rubber, thermoplastic elastomer or ceramic, or the like. In order to make the sealing performance high, preferred is the resin, rubber or thermoplastic elastomer, or the like. Before the metallic plates 11 and 12 are worked into predetermined shapes, the insulating sheets 14 and 15 may be beforehand integrated with the metallic plates 11 and 12, respectively, by bonding the sheets 14 and 15 thereonto directly or through an adhesive agent, or by painting thereonto.

The structure for the fastening is preferably a structure illustrated in FIG. 4 from the viewpoint of the sealing performance, the easiness of the production, the thickness, and others. Specifically, preferred is a fastening structure wherein: the circumferential edge region 12a of the cathode side metallic plate 12, which is one of the metallic plates, is made larger than the circumferential edge region 11a of the anode side metallic plate 11, which is the other; and the circumferential edge region 12a of the cathode side metallic plate 12a is bend down to attain the pinching and pressing of the circumferential edge region 11a of the anode side metallic plate 11 while the insulating sheet 14 and one of the insulating sheets 15 are interposed therebetween. About a producing method and producing facilities for attaining such a sealing by fastening, use may be made of, for example, a technique disclosed in JP-A-2006-86041 by the present inventors.

<Structure of the Cell Holder>

Figure 5:
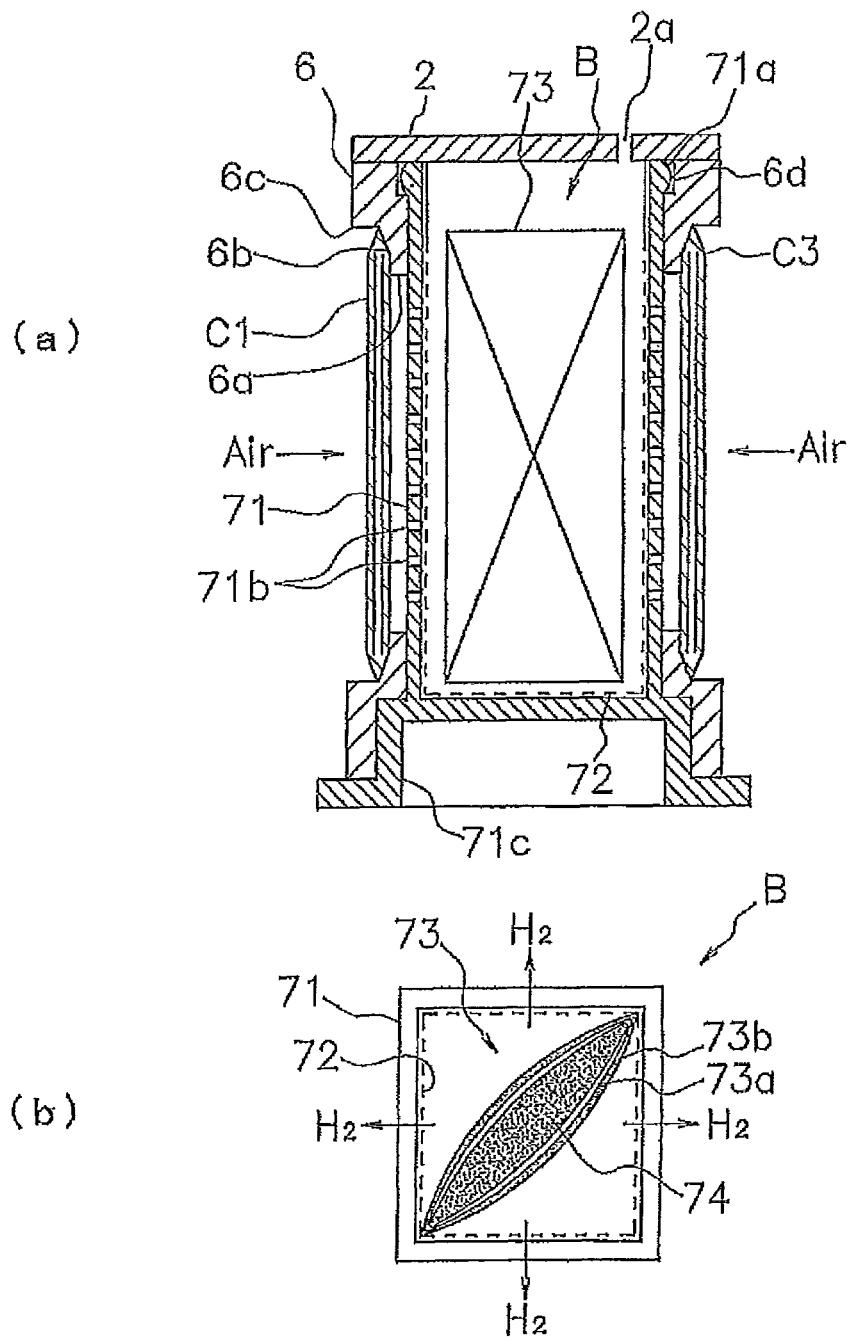
FIG. 5 Figures are a vertical sectional view (a) of the fuel cell (first embodiment), and a top view (b) of its fuel generating section.

The following will describe the structure of the cell holder 6 with reference to FIGS. 1 and 5. FIG. 5($a$) is a vertical sectional view of the example of the fuel cell of the invention, and FIG. 5($b$) is a top view of the fuel generating section B thereof. The cell holder 6 holds each of the power generating cells C1 to C4 to face one (at the anode side) of its two surfaces inward. In this way, the cell holder is combined with the power generating cells C1 to C4 to form the inner space. In the embodiment, shown is an example wherein the cell holder 6 is combined with the power generating cells C1 to C4 to constitute the cylindrical side walls and further the power generating cells C1 to C4 are arranged onto the circumferences of the cylindrical side walls, respectively.

The cell holder 6 is molded into one unit from a resin, for example, ABS. The cell holder 6 may be composed of a plurality of members. The cell holder 6 may be combined with members other than the power generating cells C to form the inner space. In the illustrated example, the cell holder 6 is combined with the substrate 2 and the fuel generating section B to form the inner space.

The power generating cells C are each held in such a manner that the cell adheres closely to a step region 6b of the outer circumference of an opening 6a made in each of the side walls of the cell holder 6. The cell is held in such a manner that the anode side metallic plate 11 constituting each of the power generating cells C adheres closely to the step region 6b.

The openings 6a in the cell holder 6 are each made open to expose an opening 11c in each of the anode side metallic plates 11 to the inner space. The power generating cells C are held to cause the metallic plates 12 to adhere closely to the step regions 6b in the state that openings 12c in the cathode side metallic plates 12 are also exposed to the outside. The shapes of the step regions 6b are each a shape consistent with the external shape (outline shape: ellipse) of each of the power generating cells C. A cell positioning region 6c is formed around each of the step portions 6b. By making the cell positioning regions 6c, the power generating cells C can be roughly positioned.

In the middle circumference of the cell holder 6 are made first grooves where connecting members 21 for connecting the power generating cells C to each other are to be arranged. The cell holder 6 is combined with the substrate 2 to form the inner space; an air hole 2a may be made therein in order to discharge a generated fuel gas when the gas is excessive in amount, or attain some other purpose.

The power generating cells C held by the cell holder 6 become high in temperature when the cells generate electric power. Thus, it is preferred that an external case (not illustrated) is fitted thereonto. It is preferred to make slits, circular holes, elliptic holes or the like at positions of the external case that correspond to the power generating cells C. In order for a person not to feel generated heat easily when the person touches the external case, it is preferred to make a large number of projections having a height of about 0.2 to 2 mm in the outer surface of the external case.

<Manner that the Cells are Connected to Each Other>

Figure 6:
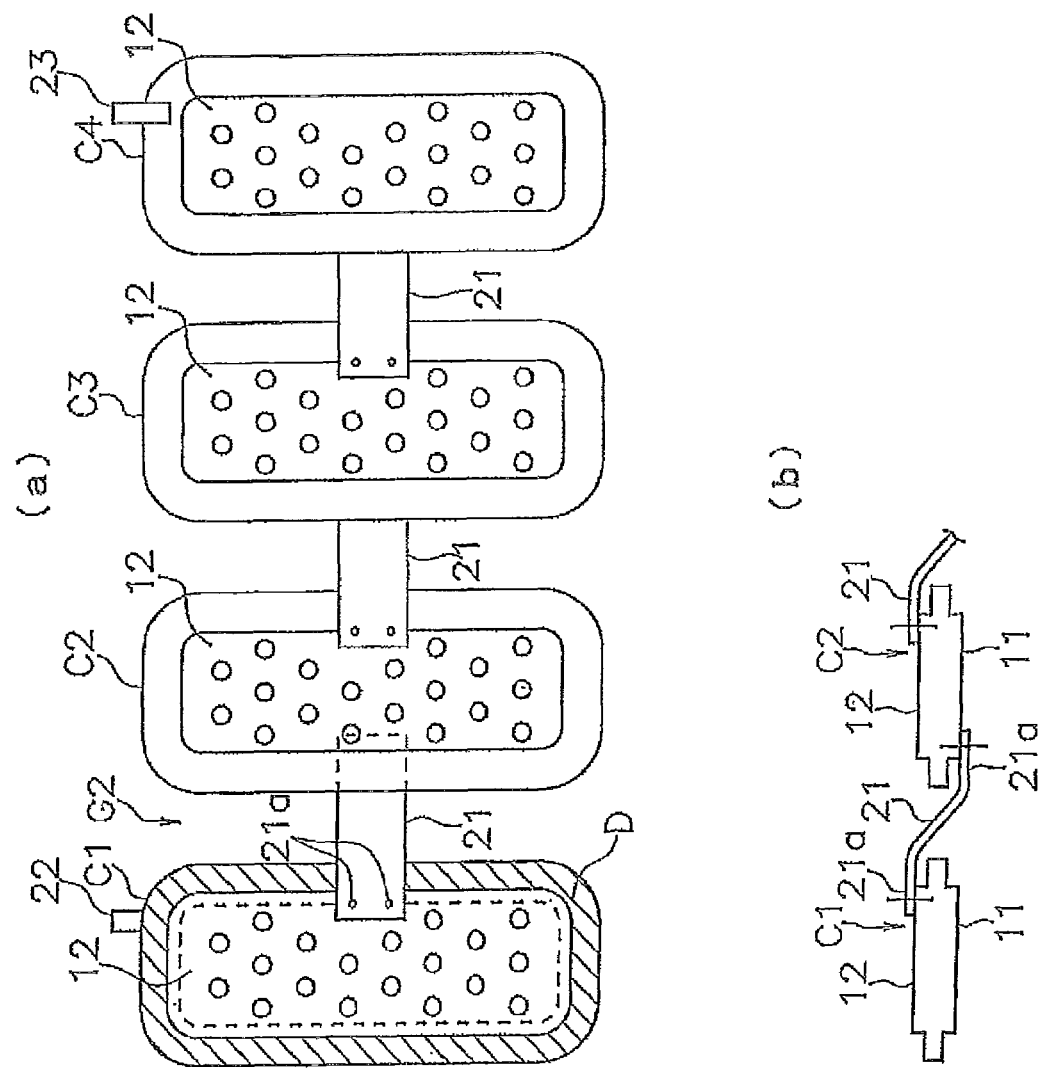
FIG. 6 Figures are views illustrating a manner that four power generating cells are connected to each other.

The following will describe the manner that the four power generating cells C are connected to each other with reference to FIG. 6. FIG. 6 is views illustrating the power generating cells C in the state that the cells are developed before fixed onto the cell holder 6. The four power generating cells C are electrically connected to each other in series through the connecting members 21. The connecting members 21 are each formed by working a thin metallic plate. The connecting members 21 are arranged into the first grooves described with reference to FIG. 1.

As illustrated in a side view of FIG. 6(b), about the connection between one of the connecting members 21 and two of the power generating cells C, the cathode side metallic plate 12 of one of the power generating cells C1 and C2, which are adjacent to each other, is electrically connected to the anode side metallic plate 11 of the other. The connecting member 21 is connected to the metallic plate 11 and the metallic plate 12 by subjecting a point represented by 21a to resistance welding.

In a peripheral region D (represented by hatching in one of FIG. 6) of each of the power generating cells C, an epoxy thermosetting resin coat is formed by screen printing. In this way, unintended short circuit through the connecting members 12 is prevented. For example, in FIG. 6(b), an insulating coat is formed not to cause the connecting member 21 connected to the anode side metallic plate 11 of the power generating cell C2 to contact the cathode side metallic plate 12 thereof. The same manner is performed in each of the other spots. Thus, a certain electrical connection can be realized.

Electrode members 22 and 23 are connected to the upper side power generating cell C1 and the lowest side power generating cell C4, respectively. The electrode members 22 and 23 are also electrically connected to the power generating cells C1 and C4, respectively, by resistance welding. The electrode members 22 and 23 are electrically connected to the substrate 2.

As described above, in order to connect the gas channels of the power generating cells C to each other in the invention, it is unnecessary to use another member, such as a pipe. This makes it possible to reduce the number of parts, and make any extra space for arranging a pipe unnecessary. Thus, this contributes to the downsizing of the fuel cell 1.

<Structure of the Fuel Generating Section>

The following will describe the structure of the fuel generating section B. The fuel generating section B is a section arranged in the inner space of the cell holder 6 to generate a fuel gas. As illustrated in FIG. 5, in the present embodiment, shown is an example wherein use is made of the fuel generating section B, in which a sheet-form hydrogen generator 73 is stored in a container 71 having porous side walls in a cylindrical form to interpose a hydrophobic porous membrane 72 therebetween.

The porosity of holes 71b made in the side walls is not particularly limited, and is, for example, from 1 to 50%. The diameter of the holes 71b made in the side walls is from 0.1 to 5 mm from the viewpoint of the dispersion and the supply of the fuel gas. The diameter of the holes 71b made in the side walls is preferably from 0.1 to 5 mm from the viewpoint of the prevention of the hydrophobic porous membrane 72 from being damaged when the pressure in the inner space rises. In order to supply hydrogen evenly into the power generating cell planes, it is also preferred that besides the holes 71b, channels grooves are made in the side walls and on the power generating cell side thereof (see FIG. 10). In this case, the width of the channel grooves is not particularly limited, and is preferably from 0.1 to 5 mm.

The container 71 has, on the top end thereof, a convex portion 71a, and this convex portion 71a is engaged with an engaging trench 6d made in the top end of the cell holder 6, whereby the fuel generating section B is formed to be removably disposed in the cell holder 6 and taken off therefrom. The container 71 has, at the lower end region thereof, a pedestal region 71c. The container 71 has a structure wherein this pedestal region is fitted into the lower end region of the cell holder 6.

The hydrophobic porous membrane 72 is laid to prevent a water component, such as mist, from scattering from the holes 71b in the container 71, and the membrane 72 can transmit the fuel gas such as hydrogen gas. Accordingly, the diameter of the pores in the hydrophobic porous membrane 72 is preferably from 0.1 to 10 μm, more preferably from 0.5 to 5 μm. It is preferred that the hydrophobic porous membrane 72 covers at least the holes 71b in the container 71. In order to prevent an excessive amount of water from leaking outside the container 71, it is preferred that the membrane 72 is extended also onto the bottom of the container 71. In short, the hydrophobic porous membrane 72 is preferably in a bag form.

Examples of the material of the hydrophobic porous membrane 72 include fluorine-contained resins, polyolefin resins, polyethersulfone, and polysulfone. Of these examples, preferred are fluorine-contained resins such as polytetrafluoroethylene, and polyolefin resins such as polypropylene.

The sheet-form hydrogen generator 73 is a sheet-form product wherein a porous layer 73b containing a granular hydrogen generating agent and a resin is formed on the top surface of a water absorptive sheet 73a, such as a filter paper piece. Details thereof will be described later. Inside the water absorptive sheet 73a is arranged a water absorber 74. The water absorber 74 may be made of any material impregnated with water, and is preferably made of water absorptive resin, absorbent cotton, water absorptive nonwoven cloth, water absorptive paper.

When hydrogen is generated in the fuel generating section B so as to be supplied to the power generating cells C, water is first supplied to the water absorbent 74 in the state that the fuel generating section B is taken off from the cell holder 6. After the water supply, the fuel generating section B is set into the cell holder 6. The water, which is supplied into the water absorbent 74, diffuses in the water absorbent 74 to reach the water absorptive sheet 73a of the sheet-form hydrogen generator 73. Furthermore, the water penetrates into the water absorptive sheet 73a to reach the porous layer 73b containing the hydrogen generating agent. In this way, the hydrogen generating agent and the water react with each other to generate hydrogen gas.

The generation rate of the hydrogen gas can be controlled by the control of the speed at which the water reaches the hydrogen generating agent, or some other operation. For example, by adhering to each other the tips of water absorptive sheets 73a having a twice-folded shape or bonding the tips of the sheets 73a to each other, or by some other method, the fuel generating section B is made into a structure into which water does not penetrate easily. In this way, the speed at which the water reaches the agent can be made small, so that the generation rate of hydrogen gas can be controlled into a rate nearer to a constant value. The water absorbent 74 which has, itself, a small water diffusing rate may be used. By this method also, the rate at which the water reaches the hydrogen generating agent can be controlled.

<Sheet-Form Hydrogen Generator>

The sheet-form hydrogen generator 73 may be the sheet-form product, wherein the porous layer 73b, which contains a granular hydrogen generating agent and a resin, is formed on the top surface of the water absorptive sheet 73a, such as a filter paper piece. The hydrogen generating agent is an agent that is reactive with a reaction liquid such as water to generate hydrogen gas.

The hydrogen generating agent, which is highly reactive, may be an agent containing a metal hydride compound, examples thereof including calcium hydride, lithium hydride, potassium hydride, sodium boron hydride, potassium boron hydride, lithium aluminum hydride, sodium aluminum hydride, and magnesium hydride. It is known that these compounds, and the like each react with water abruptly or explosively to generate hydrogen gas. The compounds each exhibit a larger reactivity with water than the reactivity of magnesium hydride with water.

The hydrogen generator may contain, as a hydrogen generating agent other than the (metal hydride) compound, a metal such as aluminum, iron, magnesium or calcium, or a metal hydride complex compound other than the above. About the metal hydride compound, the metal and the metal hydride complex compound, two or more species of any one thereof may be used in combination. Two or more of the three compounds may be used in combination. When the compound-combination is used, it is preferred that the combination includes a compound that promotes the generation of pores based on air bubbles easily. The compound is in particular preferably calcium hydride.

The average particle diameter of the granular hydrogen generating agent is preferably from 1 to 100 µm, more preferably from 6 to 30 µm, even more preferably from 8 to 10 µm from the viewpoint of the control of the dispersibility thereof in the pours body or the reactivity.

The content by percentage of the hydrogen generating agent in the porous body is preferably from 10 to 60% by weight, preferably from 30 to 50% by weight in order that the agent may keep an appropriate reactivity and some hydrogen generation amount certainly.

Examples of the used resin include thermosetting resin, thermoplastic resin, and heat-resistant resin. Thermosetting resin is preferred. Examples of the thermoplastic resin include polyethylene, polypropylene, polystyrene, acrylic resin, fluorine-contained resin, polyester, and polyamide. Examples of the heat-resistant resin include aromatic polyimide, polyamide, and polyester.

Examples of the thermosetting resin include epoxy resin, unsaturated polyester resin, phenolic resin, amino resin, polyurethane resin, silicone resin, and thermosetting polyimide resin. Of these examples, preferred is epoxy resin since the resin can keep the porous structure appropriately in the hydrogen-generation reaction.

The content by percentage of the resin in the porous body is preferably from 30 to 90% by weight, more preferably from 50 to 70% by weight in order that the hydrogen generator can keep an appropriate shape-keeping performance and a hydrogen generation amount into some degree certainly.

The porous layer may contain, as an optional component other than the above-mentioned components, a catalyst, a filler, a foaming agent or some other component. Effective examples of the catalyst include metal catalysts for hydrogen generating agents, and alkali compounds such as sodium hydroxide, potassium hydroxide and calcium hydroxide.

The foaming agent may be a liquid which is phase-separated from the thermosetting resin in an uncured state and dispersed therein, and is gasified at the reaction temperature of the thermosetting resin. A very small amount of a reaction liquid which is reactive with the hydrogen generating agent to generate hydrogen gas may be added to the uncured thermosetting resin. Examples of the reaction liquid include water, acidic aqueous solutions, and alkaline aqueous solutions.

The porous layer has a structure made porous by air bubbles (foaming), sintering, phase separation or the like, and preferably has a structure made porous by air bubbles. The air bubbles for making the structure porous may be bubbles generated by a foaming agent, and is preferably hydrogen gas generated from the hydrogen generating agent.

In other words, the porous layer is preferably produced by a production process containing the step of mixing the granular hydrogen generating agent with the uncured thermosetting resin, painting this mixture onto a water absorptive sheet, and then curing the thermosetting resin while hydrogen gas is generated from the hydrogen generating agent.

About the porous layer, the density thereof is preferably from 0.1 to 1.2 g/cm$^3$, more preferably from 0.2 to 0.9 g/cm$^3$, even more preferably from 0.3 to 0.5 g/cm$^3$. If the layer has a density in this range, the permeability of the reaction liquid becomes appropriate and the layer becomes better also in handleability. The density can be controlled by, for example, the generation amount of hydrogen gas.

The air bubble diameter of the porous body for generating hydrogen is preferably from 0.1 to 2 mm, more preferably from 0.5 to 1 mm from the viewpoint of an appropriate control of the permeability of the reaction liquid. The air bubble diameter can be controlled by, for example, the generation amount of hydrogen gas. In order to control the air bubble diameter or the density, the thermosetting resin may be cured under a pressure-applied condition.

In order to generate hydrogen gas from the hydrogen generating agent, use may be made of a method of adding a very small amount of the reaction liquid beforehand to the uncured thermosetting resin, or a method of using the reaction liquid contained in the uncured thermosetting resin. Preferred is a method of eliminating hydrogen gas from the hydrogen generating agent (in the case of the metal hydride compound) by heating for the curing reaction.

The temperature when hydrogen gas is eliminated from the hydrogen generating agent is varied in accordance with the kind of the metal hydride compound, and is preferably from 50 to 250° C., more preferably from 80 to 200° C. In other words, it is preferred to select a temperature in this range as a temperature for curing the uncured thermosetting resin. The temperature for generating hydrogen and the curing temperature may be made different from each other.

The thickness of the porous layer obtained by the curing is preferably from 0.1 to 10 mm, more preferably from 0.5 to 2 mm in order to cause water and others to permeate sufficiently and evenly into the layer to conduct an even reaction.

The water absorptive sheet may be a product wherein a hydrophilic material is made into a porous sheet form, and is preferably a water absorptive nonwoven cloth piece, a water absorptive woven cloth piece, a water absorptive paper piece, a filter paper piece or the like. These pieces may be used in combination, or may each be used together with a water absorptive resin.

The thickness of the water absorptive sheet is preferably from 0.1 to 10 mm, more preferably from 0.2 to 2 mm from the viewpoint of the maintenance of the strength or an improvement in the in-plane permeating property thereof. The density of the water absorptive sheet is preferably from 0.1 to 1 g/cm$^3$, more preferably from 0.4 to 0.6 g/cm$^3$ in order that the sheet may gain water holding ability and an even in-plane permeating property.

The water absorptive sheet may be laid onto only one surface of the porous layer, or water absorptive sheets may be laid onto both surfaces thereof, respectively. When the water absorptive sheets may be laid onto both the surfaces, the lamination can be produced by painting the raw material of the porous layer onto any one of the water absorptive sheets, and then laminating the other water absorptive sheet further onto the upper surface thereof. When the raw material of the porous layer is painted thereon and then a hydrophobic porous membrane is laminated onto the upper surface thereof, it is unnecessary to arrange a hydrophobic porous membrane separately inside the container.

When the sheet-form hydrogen generator is folded, it is preferred to paint the raw material of a porous layer onto a planar water absorptive sheet and then fold the workpiece before the raw material is cured in order to keep the shape. In the case, it is preferred to laminate a water absorptive sheet or a hydrophobic porous membrane, in particular, onto the upper surface of the porous layer.

<Ammonia Removing Agent>

In the present invention, an ammonia removing agent may be set in spaces between the side walls of the container 71 and the power generating cells C in order to remove ammonia, which is an impurity. Specifically, a sheet-form ammonia remover may be arranged around each of the side walls of the container 71. As the ammonia remover, a remover made into a sheet form is commercially available. It is allowable to use a remover wherein a granular adsorbent or the like is held in a gas permeable bag.

By a hydrogen generating agent as described above, hydrogen gas wherein the ratio of hydrogen is about 100% of the whole, from which water is excluded, can be generated. The hydrogen gas may contain therein a very small amount of ammonia, which is an impurity. The ammonia appears to be produced as follows: when magnesium is used to produce the hydrogen generating agent, magnesium reacts with nitrogen in the air to produce a nitrogen compound (such as magnesium nitride) and then this reacts with water. At the time, the following reaction would be caused:

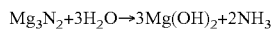

$$Mg_3N_2 + 3H_2O \rightarrow 3Mg(OH)_2 + 2NH_3$$

About any other metal hydride also, in hydrogen gas generated therefrom, a very small amount of ammonia may be contained by the same mechanism.

Examples of the ammonia removing agent include adsorbents for adsorbing ammonia in hydrogen to be removed (the adsorbing may be a chemical absorption such as adsorption/decomposition or reaction adsorption), absorbents for dissolving ammonia to be removed, reacting agents for removing ammonia through reaction, and decomposers for removing ammonia by decomposition (such as thermal decomposition, or decomposition through catalytic reaction). It is preferred to set an adsorbent for removing ammonia by physical adsorption or chemical adsorption.

Of the adsorbents, more preferred is an adsorbent for removing ammonia by physical adsorption or chemical adsorption. Even more preferred are one or more selected from the group consisting of solid acids, activated carbons (other than ones corresponding to solid acids), zeolites (other than ones corresponding to solid acids), and molecular sieves. It is preferred to use, out of these adsorbents, a solid acid from the viewpoint of the ammonia-adsorbing/removing ability thereof, or the adsorbing capability at a higher temperature.

Solid acids are classified to solid acids that are themselves granular, and acids in each of which a solid acid or liquid acid is carried on granules. A solid acid wherein a metal salt is carried on activated carbon is preferred from the viewpoint of costs, the producibility, and others. Examples of the metal salt include sulfates, phosphates, chlorides, and nitrates. As the metal that forms the salt, a metal that exhibits acidity in the form of a salt of the metal can be preferably used.

Examples of (commercially available products of) the activated carbons (which may be activated carbons corresponding to solid acids) include GW48/100, GW-H48/100, GG10/20, 2GG, GLC10/32, 2GS, GW10/32, GW20/40, KLY10/32, KW10/32, and KW20/42 (each manufactured by Kuraray Chemical Co., Ltd.); an SWWB agent (for alkali), a WB agent, and an S agent (for acid) (each manufactured by Anico Japan (transliterated)); and 4T-B, 4T-C, 4G-H, 4SA, 2GS, and GW20/4042 (each manufactured by Kuraray Chemical Co., Ltd.). Preferred are 4T-B, the SWWB agent (for alkali), and the WB agent.

Examples of (commercially available products of) the zeolites include BX, HISIV and R-3 (each manufactured by Union Showa K.K.). BX is preferred.

Examples of the molecular sieves include ZEOLAM A-3, and ZEOLAM A-4 (each manufactured by Tosoh Corp.). ZEOLAM A-4 is preferred.

<Circuit Structure>

The following will describe a circuit structure for controlling the fuel cell 1. The outputted voltage from the individual power generating cells C is preferably boosted up to a predetermined voltage through a DC-DC converter (corresponding to a booster circuit). Furthermore, the power is supplied from the electric power supply terminal to an external instrument, a portable telephone or the like through a circuit section added to the downstream side of the converter. The circuit section has a stabilizing circuit and others, and is controlled in such a manner that an appropriate outputted voltage or outputted current can be supplied.

The converter, the circuit section and others are held inside the frame form body of the cell holder 6. The substrate, elements and other components that constitute the circuit section are wholly or partially held inside the frame form body, whereby the space can be usefully used. This contributes to the downsizing of the fuel cell.

Different Embodiment of First Embodiment

<Structure of the Whole>

Figure 7:
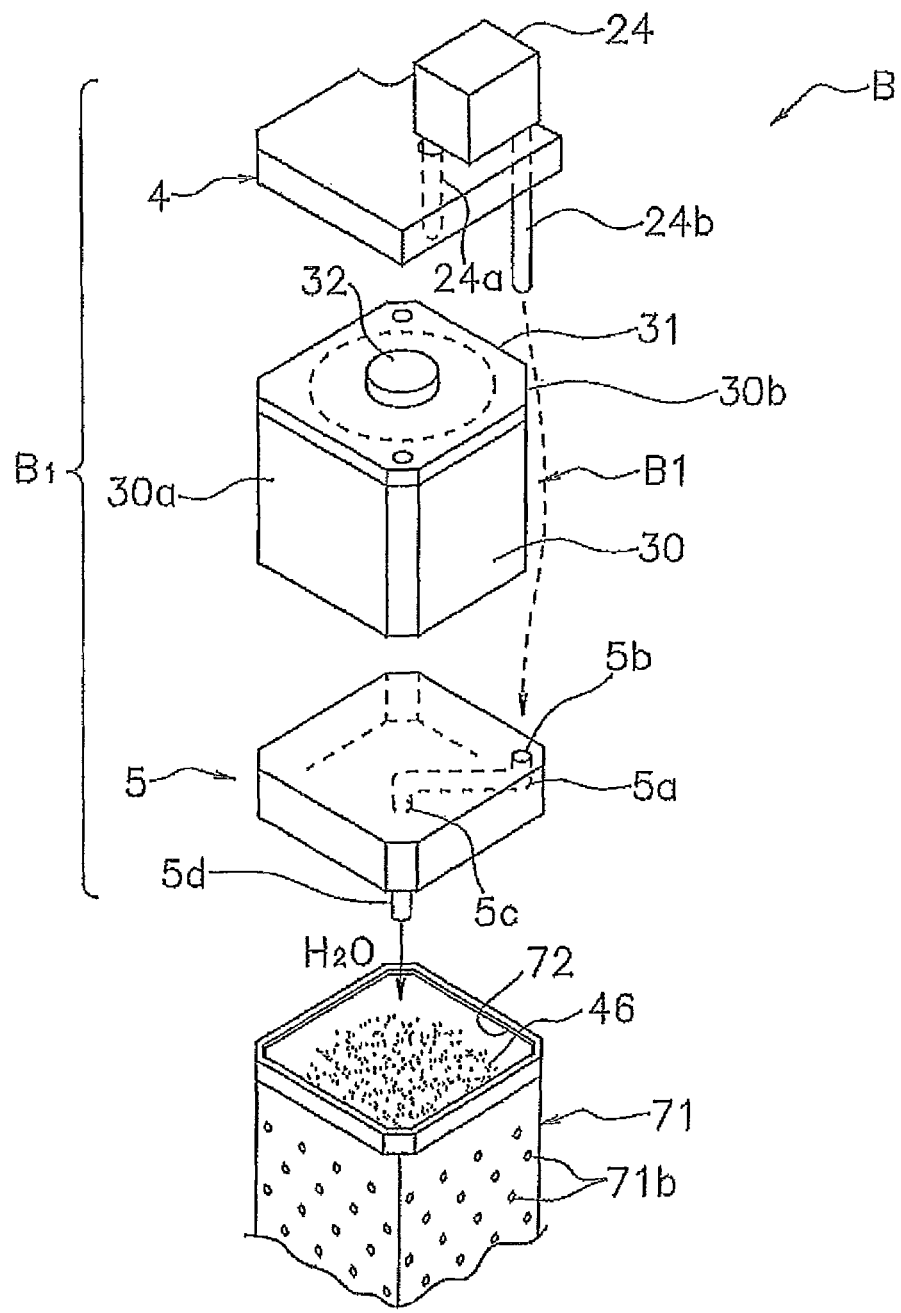
FIG. 7 is a schematic perspective view illustrating elements which constitute the fuel generating section in the state that the elements are separated.

In the above-mentioned embodiment, shown has been an example wherein a reaction liquid such as water is supplied at a time. In the present invention, however, a fuel cell may be made into a structure wherein a storing section for a reaction liquid is set up and the stored reaction liquid is gradually supplied into a fuel generating agent. The storing section for the reaction liquid may be set in the inner space of a cell holder 6, or may be set outside the cell holder 6. As illustrated in FIG. 7, in the present embodiment, shown is an example wherein a water storing section B1 is set, as a fuel cell generating section B to be arranged in the inner space, on a container 71. FIG. 7 is a schematic perspective view illustrating elements constituting the fuel cell gas generating section B in the state that the elements are separated from each other. Hereinafter, parts or regions different from those of the first embodiment will be described; the other parts or regions are the same as in the first embodiment.

In FIG. 7, a valve 24 is mounted in a substrate 4. The valve 24 has a function of sending water in the water storing section B1 into a hydrogen generator 73 in the container 71. The valve 24 has a supplying pipe 24a and a dispersing pipe 24b. The driving of the valve 24 is turned on or off through a controlling circuit (not illustrated) mounted on the substrate 4. Thus, the valve 24 intermittently sends water to the fuel generating section B2. The supplying pipe 24a and the discharging pipe 24b correspond to a reaction liquid supplying channel for supplying water, which is a reaction liquid, to the hydrogen generator 73.

As illustrated in FIG. 7, the valve 24 is mounted on the upper surface of the substrate 4, and is held in the inner space of the cell holder 6. In this way, the valve 24 is wholly (or partially) held in the inner space of the cell holder 6, whereby the restricted space can be usefully used so that the space can be effectively used.

The water storing section B1 has a body case 30 and a lid case 31, and a rubbery plug 32 is fitted to the center of the lid case 31. At a corner 30b of the body case 30, a cutout 30b in a slant face form is made, so as to certainly keep a space wherein the discharging pipe 24b is to be arranged.

In a channel plate 5, a water channel 5a, which also corresponds to a reaction liquid supplying channel, is formed. The plate 5 has an inlet 5b to be inserted into the discharging pipe 24b under pressure so as to be connected thereto, and an outlet 5c to be connected to the supplying pipe 5d. In this manner, the water channel can be shifted to the center.

The water storing section B1, the channel plate 5 and the substrate 4 are integrated with each other by an appropriate method, for example, screwing or bonding, so as to be made into a unit. The following will describe the structures of the individuals in detail.

<Structure of the Water Storing Section>

Figure 8:
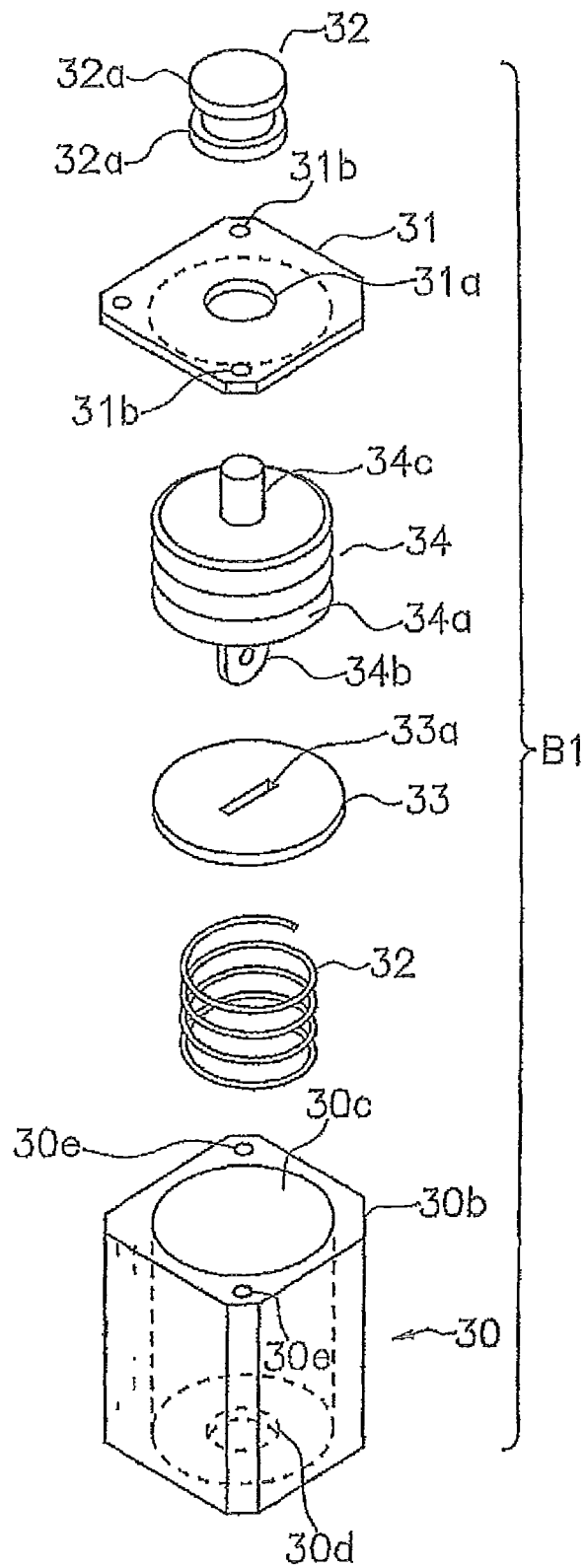
FIG. 8 is an exploded perspective view illustrating the structure of a water storing section.

Referring to an exploded perspective view shown as FIG. 8, the structure of the water storing section is described. The body case 30 has a rectangular parallelepiped shape as a whole, and has therein a cylindrical space 30c. In the bottom of the space 30c, a positioning concave 30d is formed for positioning a coil spring 35 (corresponding to a reaction liquid urging means). The coil spring 35 is arranged between a slide plate 33 and the bottom of the space 30c, and urges the slide plate 33 upward. The slide plate 33 is molded from a synthetic resin such as polyacetal, and the body case 30 is molded from ABS or the like. In this way, the slide plate 33 can be smoothly moved upward and downward.

A water storing case 34 (corresponding to a reaction liquid storing member) has an outer surface made into bellows 34a, so as to have spring property. A predetermined amount of water is stored in the water storing case 34. At one of (two) ends of the water storing case 34, a positioning projection 34b is formed, and the projection 34b is inserted into a positioning slit 33a in the slide plate 3. At the other end of the water storing case 34, a cylindrical projection 34c is formed. The projection 34c is inserted into a hole 31a provided at the center of the external lid case 31, and further the rubbery plug 32 is fitted onto the projection 34c.

Holes 31b for screwing are made in the external lid case 31, and lower holes 30e made in the body case 30 are used to screw/fasten the external lid case 31 onto the body case 30 with screws not illustrated.

In the rubbery plug 32, flanges 32a are provided at two positions thereof, the upper and lower, respectively. Thus, the rubbery plug 32 can be jointed to the water storing case 34 not to be pulled out therefrom. In the rubbery plug 32, no hole is made, so that water in the water storing case 34 is not discharged to the outside. As illustrated in FIG. 7, however, when the rubbery plug 32 is jointed thereto, the supplying pipe 24a of the valve 24 can be stuck into the rubbery plug 32 so that the water can be discharged through the valve 24. Accordingly, the supplying pipe 24a can easily be inserted into the rubbery plug 32 and taken off therefrom so that the attachment and the release of the water storing section B1 can certainly be kept with ease.

A projection region is formed on the rear side of the external lid case 31, and the region can be fitted into the cylindrical space 30c. When the individual members are assembled as illustrated in FIG. 7, the members are set in the state that urging force acts the water inside the water storing case 34 from the coil spring 32 at any time.

The reaction liquid, which is caused to react with a hydrogen generating agent which will be described below may be an aqueous solution wherein an acidic component is dissolved or aqueous solution wherein an alkaline component is dissolved to promote the reaction with water, or some other liquid besides the above-mentioned liquid, water. In the present invention, water can be preferably used from the viewpoint of the storability and costs.

<Hydrogen Gas Generating Agent>

Next, a hydrogen generating agent 46 is described. The agent may be the same hydrogen generating agent as used in the sheet-form hydrogen generator. The agent may also be a hydrogen generating agent containing magnesium hydride particles and, if necessary, further containing a catalyst component, a metal such as aluminum, an alkaline inorganic compound, and aggregation restraining particles.

Magnesium hydride reacts with water to generate hydrogen gas; a reaction as described in the following would be caused:

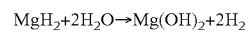

This reaction is an exothermic reaction. By keeping the temperature of the system, the reaction can be advanced in a temperature-rising state.

About magnesium hydride, the reactivity thereof can be improved by a method of generating compressive force and/or shearing force in particles thereof, or some other method. Specific examples thereof include a method using a pulverizing machine such as a ball mill, a roller mill, a high-speed rotation mill, a medium-stirring mill, a gas-flowing pulverizer or a compaction shearing mill, and a method using a press machine that may be of various types. Of these methods, the method using a pulverizing machine is preferred, and the method using a ball mill is particularly preferred.

The method using a ball mill can cause the generation of an even compressive force and/or shearing force in accordance with the size of the particles of magnesium hydride; thus, the method is preferred. The average particle diameter of magnesium hydride is preferably from 0.1 to 100 μm, more preferably from 1 to 50 μm, even more preferably from 5 to 20 μm to make the reactivity high.

The content by percentage of the magnesium hydride particles in the whole of the hydrogen generating agent is preferably 80% or more by weight, more preferably 90% or more by weight, even more preferably 95% or more by weight.

The metal incorporated if necessary is preferably a metal reactive water to generate hydrogen, such as particulate aluminum, particulate iron, or particulate magnesium. Particulate aluminum is in particular preferred. A metal catalyst may be added, examples of the metal including nickel, vanadium, manganese, titanium, copper, silver, zinc, zirconium, cobalt, chromium and calcium, and any alloy thereof.

When the metal, such as aluminum, is used together, a metal in the form of fine particles is preferred to make the reactivity high. Metal particles having an average particle diameter of 100 μm or less are preferred; ones having an average particle diameter of 1 to 50 μm are more preferred;

and ones having an average particle diameter of 1 to 10 µm are even more preferred. If the average particle diameter is less than 1 µm, the particles are not easily produced. Additionally, the particles aggregate secondarily; thus, by sintering, the surface area is remarkably lowered when the temperature is raised. As a result, the generation of hydrogen tends to be decreased.

The aluminum particles are preferably particles produced by an atomizing process, and are also preferably particles the surface oxide films of which are subjected to removing treatment. Such aluminum particles may be various commercially available products.

The content by percentage of the metal in the whole of the hydrogen generating agent is preferably from 1 to 10% by weight. If the metal content by percentage is more than 10% by weight, the reaction rate of the whole tends to be lowered and further the hydrogen generation amount relative to the weight of the raw materials tends to be decreased.

When the hydrogen generating agent contains the alkaline inorganic compound, examples of the alkaline inorganic compound include oxides, hydroxides and carbonates of any alkali metal or any alkaline earth metal. The alkaline inorganic compound is preferably at least one selected from the group consisting of calcium oxide, sodium hydroxide, potassium hydroxide, calcium hydroxide, borax, sodium carbonate, and calcium carbonate, and is in particular preferably calcium oxide.

The content by percentage of the alkaline inorganic compound in the whole of the hydrogen generating agent is from 0.1 to 10% by weight, preferably from 0.2 to 5% by weight, more preferably from 0.5 to 3% by weight.

When the hydrogen generating agent contains the aggregation restraining particles, the aggregation restraining particles may be fine particles inert to hydrogen generating reaction, or other particles. The aggregation restraining particles are preferably made of one or more species selected from the group consisting of carbon black, silica, cerium oxide, aluminum oxide, and titanium oxide. Of these species, carbon black is particularly preferred to make the aggregation restraining effect high.

The content by percentage of the aggregation restraining particles in the whole of the hydrogen generating agent is preferably from 0.1 to 30% by weight, more preferably from 1 to 20% by weight. If the content by percentage of the aggregation restraining particles is more than 30% by weight, the content by percentage of magnesium hydride relatively decreases so that the total generation amount of hydrogen gas tends to become insufficient.

As the carbon black, use may be made of any species thereof, examples thereof including channel black, thermal black, acetylene black, ketjen black and furnace black. Carbon black subjected to hydrophilicity-imparting treatment and others exist; however, in the present invention, untreated carbon black, which is hydrophobic, is preferably used to make the aggregation restraining effect high. These species may each be used to carry calcium oxide. The primary average particle diameter of the carbon black is preferably from 0.01 to 0.5 µm.

The hydrogen generating agent 46 in the invention may be a powdery mixture, and may be a compacted product in the form of pellets, a tablet or the like, which is obtained by compacting the mixture by pressuring press. By performing such a compacting, the hydrogen generation amount per unit volume can be increased.

<Circuit Structure>

Figure 9:
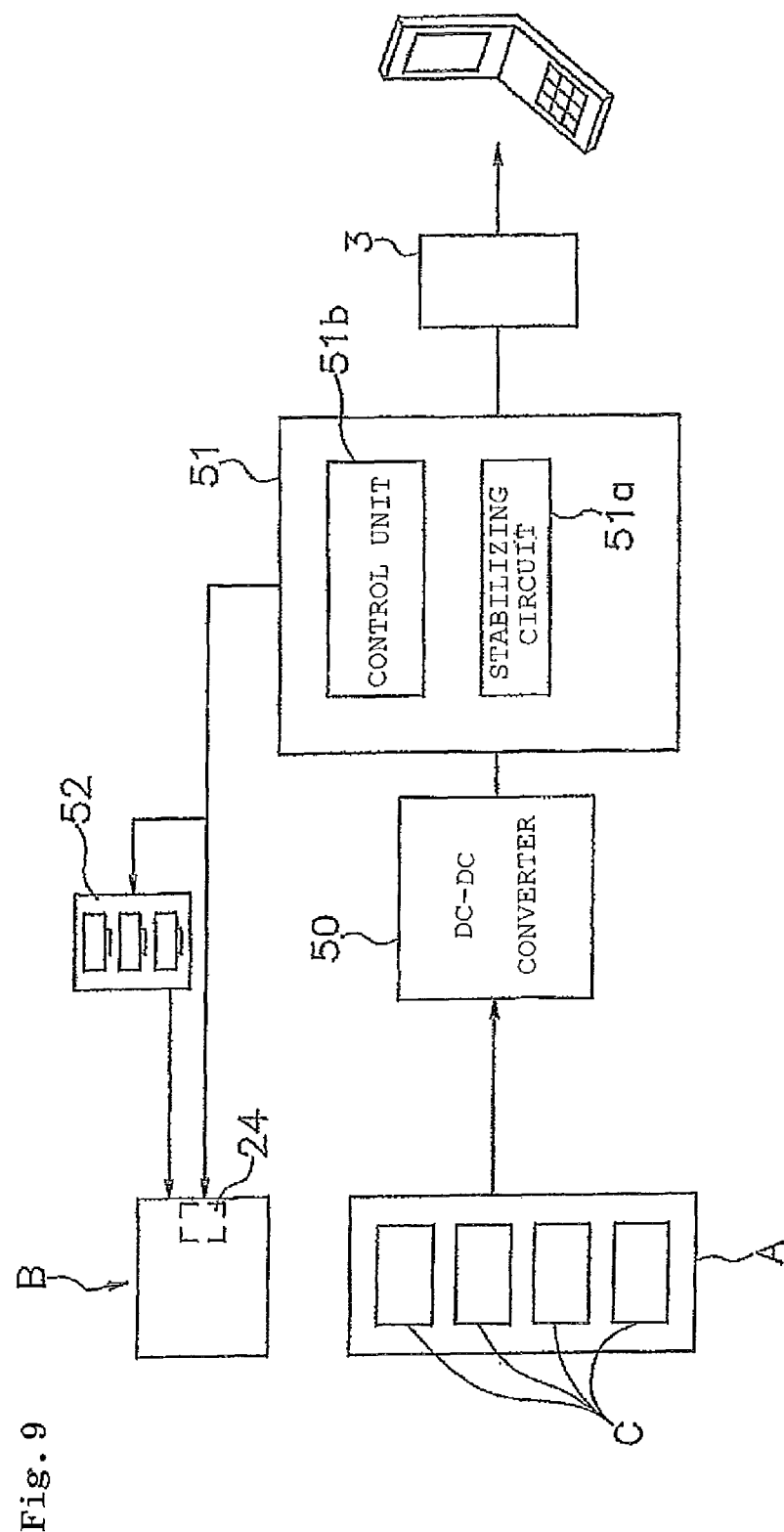
FIG. 9 is a block diagram illustrating a circuit structure.

With reference to FIG. 9, the following will briefly describe a circuit structure for controlling the fuel cell 1. The outputted voltage from the individual power generating cells C is preferably boosted up to a predetermined voltage through a DC-DC converter 50 (corresponding to a booster circuit). Furthermore, the power is supplied from an electric power supply terminal 3 to an external instrument, a portable telephone or the like through a circuit section 51 added to the downstream side of the converter 50.

The circuit section 51 has a stabilizing circuit 51*a* and others, and is controlled in such a manner that an appropriate outputted voltage or outputted current can be supplied. A control unit 51*b* controls the driving of the valve 24. The driving of the valve 24 is intermittently turned on/off, thereby supplying a fixed amount of water to the fuel gas generating section B. About the driving power source for the valve 24, the valve 24 can be driven basically by an outputted voltage from the power generating cells C. However, the valve 24 cannot be driven by the power generating cells C when the fuel cell is started up at the initial stage. The valve 24 and the circuit section 51 correspond to a switching control mechanism.

Thus, the circuit structure has button cells 52 as an external power source, and the cells causes the valve 24 to be initially driven. After the initial driving ends, a control is made in such a manner that the driving (source) of the valve 24 is switched from the button cells 52 to the power generating cells C.

The converter 50, the circuit section 51, the button cells 52 and the others illustrated in FIG. 9 are held inside the frame form body of the cell holder 6. The substrate, elements and other components that constitute the circuit section 51 are wholly or partially held inside the frame form body, whereby the space can be usefully used. This contributes to the downsizing of the fuel cell. The bottom cells 52 may be held in the cell holder 6.

<Effect>

The following will describe the effect of the fuel cell 1 according to this embodiment. In order to drive the fuel cell 1, it is necessary to supply water into the fuel generating section B. The supply of water is attained by driving the valve 24. The electric power for driving the valve 24 is obtained from the power generating cells C. However, the power generating cells C are not initially driven; therefore, the driving of the valve 24 is attained by use of the button cells 52, which are external power sources. The period when the valve 24 is open at the time of the initial action is, for example, 30 msec. In this manner, a predetermined amount of water is supplied to the fuel gas generating section B, so that hydrogen gas is generated. The hydrogen gas is supplied to the individual power generating cells C to generate electricity, thereby yielding electric power. After the time, this electric power is used to make it possible to drive the valve 24.

Next, a path for the water supplying is described. When the valve 24 is turned on so as to be made open, a predetermined amount of water stored in the water storing container 34 is discharged from a discharging pipe 23*b* of the valve 24. A pressuring force is caused to act onto water in the water storing container 34 by effect of the coil spring 35 at any time. This force makes an attempt for causing water in the water storing container 34 to flow out. Accordingly, by making the valve 24 open, the predetermined amount of the water is discharged from the discharging pipe 23*b*.

The tip of the discharging pipe 23*b* is introduced through the inlet 5*b* in the channel plate 5 to the water channel 5*a*. The water is discharged from the water absorbing pipe 5*d* connected to the outlet 5*c*. This channel plate 5 makes it possible to shift the port for discharging the water to the center.

When the water is supplied to the hydrogen generating agent 46, the water reacts with the hydrogen generating agent 46 to generate hydrogen gas. The generated hydrogen gas is supplied through the hydrophobic porous body 72 and the openings 71b to the power generating cells C in the same manner as in the first embodiment. As a result, electric power is generated. Cotton or the like may be set onto the upper surface of the hydrogen generating agent 46, so that the water or the like can be prevented from being locally supplied thereto.

Second Embodiment

In the first embodiment, shown has been an example wherein a cell holder is combined with a plurality of power generating cells to constitute cylindrical side walls, and the power generating cells are arranged onto the circumferences of the cylindrical side walls, respectively. However, as illustrated in FIG. 10, it is allowable in the present invention that a cell holder 6 is combined with power generating cells C to constitute a flat boxy body and the power generating cells C are arranged in one of opposing surfaces S1 and S2 of the boxy body (or in the two surfaces). FIG. 10(a) illustrates a perspective view of an example of the fuel cell of the second embodiment (in the state that its fuel generation section B is inserted up to the middle), and FIG. 10(b) illustrates a vertical sectional view thereof (in the state that the fuel generation section B is inserted). Hereinafter, parts or regions different from the first embodiment will be described. The other parts or regions are the same as in the first embodiment.

In the present embodiment, shown is an example wherein the four power generating cells C are held on only one of the opposing surfaces S1 and S2 of the boxy body to form an inner space. The cell holder 6 holds each of the power generating cells C1 to C4 to face one (at the anode side) of its two surfaces inward, whereby the cell holder 6 is combined with the power generating cells C1 to C4 to form the inner space.

The cell holder 6 is molded into one unit from a resin, for example, ABS. Preferably, in the state that the power generating cells C are electrically connected to each other, the cells C and the cell holder 6 are formed into one unit by insert molding. The cell holder 6 may be combined with members other than the power generating cells C to form the inner space. In the illustrated example, the cell holder 6 is combined with the fuel generating section B to form the inner space.

The power generating cells C are held in an opening 6a made in the opposing surface S1 of the cell holder 6. At this time, it is preferred that the present embodiment is made into a structure wherein the circumference of the power generating cells C is sealed with the resin constituting the cell holder 6 by insert molding. The power generating cells C are electrically connected to each other in advance, and connecting members 21 for connecting the power generating cells C to each other are embedded in the resin constituting the cell holder 6. At the time of the insert molding, electrodes 23 and others are exposed to the outside of the cell holder 6.

The inner space of the cell holder 6 has such a shape that the fuel generating section B, which is flat, can be inserted into the space. An air hole 2a may be made in the cell holder 6 to discharge generated fuel gas when the gas is excessive in amount, or attain some other purpose. The fuel generating section B is preferably made to be removably disposed in the cell holder 6 and taken off therefrom.

In the present embodiment, shown is an example wherein use is made of the fuel generating section B that is a section wherein a sheet-form hydrogen generator 73 is held in a flat container 71 having, as a single side thereof, a porous side wall. Between the side wall of the container 71 and the sheet-form hydrogen generator 73, a hydrophobic porous membrane 72 may be interposed in order to prevent a water component, such as mist, from scattering from a hole 71b in the container 71.

The sheet-form hydrogen generator 73 is a product formed by sandwiching a porous layer 73b containing a granular hydrogen generating agent and a resin between portions of a water absorptive sheet 73a, such as a filter paper piece. In this embodiment, it is preferred to make the water absorption amount of the water absorptive sheet 73a larger since no water absorber 74 is arranged. It is preferred from this viewpoint that the thickness of the water absorptive sheet 73a is set into the range of 0.5 to 2.0 mm.

When hydrogen is generated from the fuel generating section B so as to be supplied to the power generating cells C, water is first supplied to the water absorptive sheet 73a in the state that the fuel generating section B is taken off from the cell holder 6. After the water supply, the fuel generating section B is set into the cell holder 6. While water supplied to the water absorptive sheet 73a diffuses into the water absorptive sheet 73a, the water penetrates into the water absorptive sheet 73a to reach the porous layer 73b containing the hydrogen generating agent. In this way, the hydrogen generating agent and the water react with each other to generate hydrogen gas. The hydrogen gas permeates through the water absorptive sheet 73a to be discharged to the outside of the water absorptive sheet 73a, and is then supplied through the hydrophobic porous membrane 72 and the hole 71b in the container 71 to the power generating cells C. At this time, the hydrogen is evenly supplied into the power generating cell planes with ease since channel grooves are made in the surface of the container 71 at the power generating cell C side.

Figure 11:
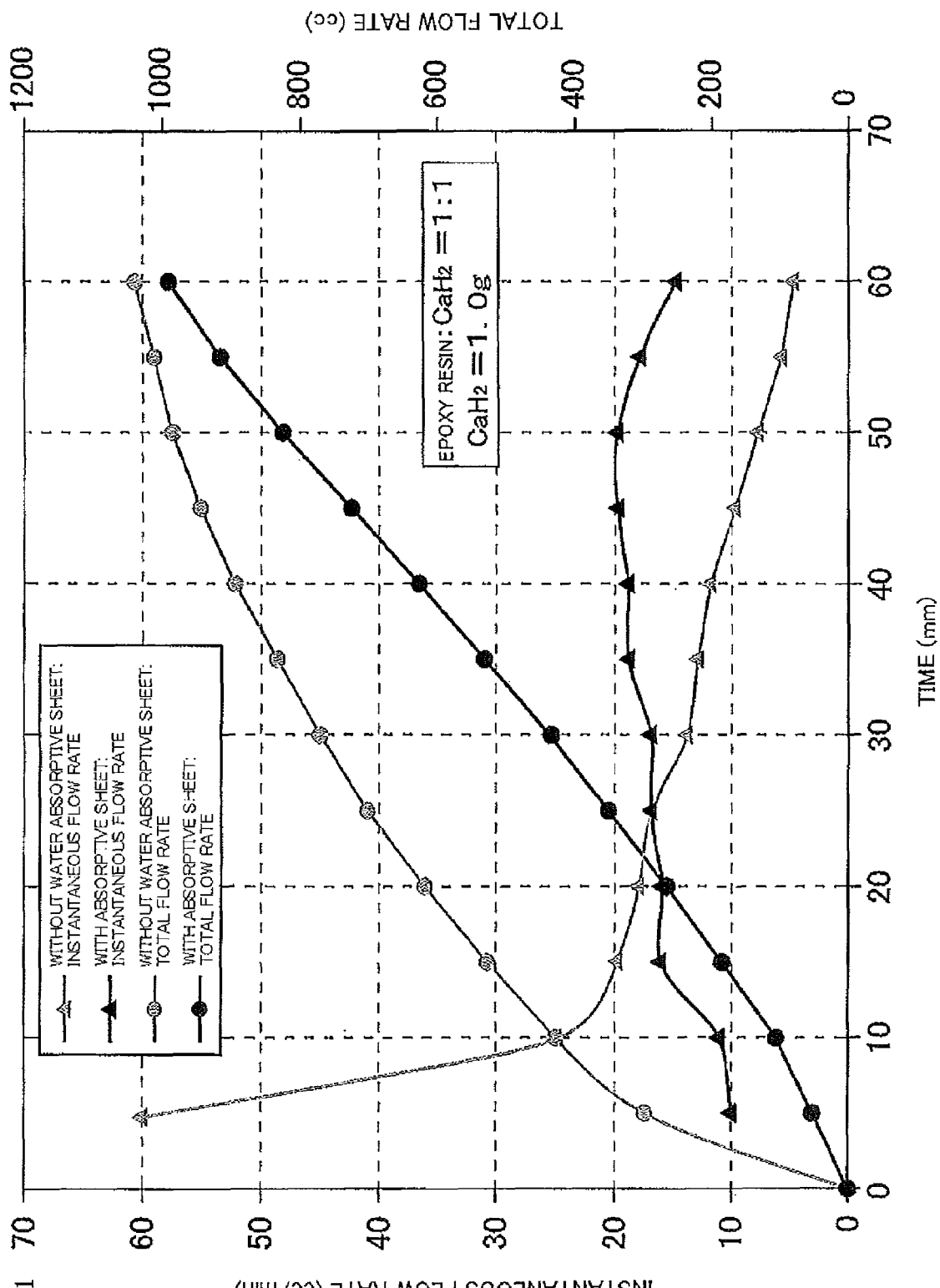
FIG. 11 is a graph showing experimental results.
Figure 12:
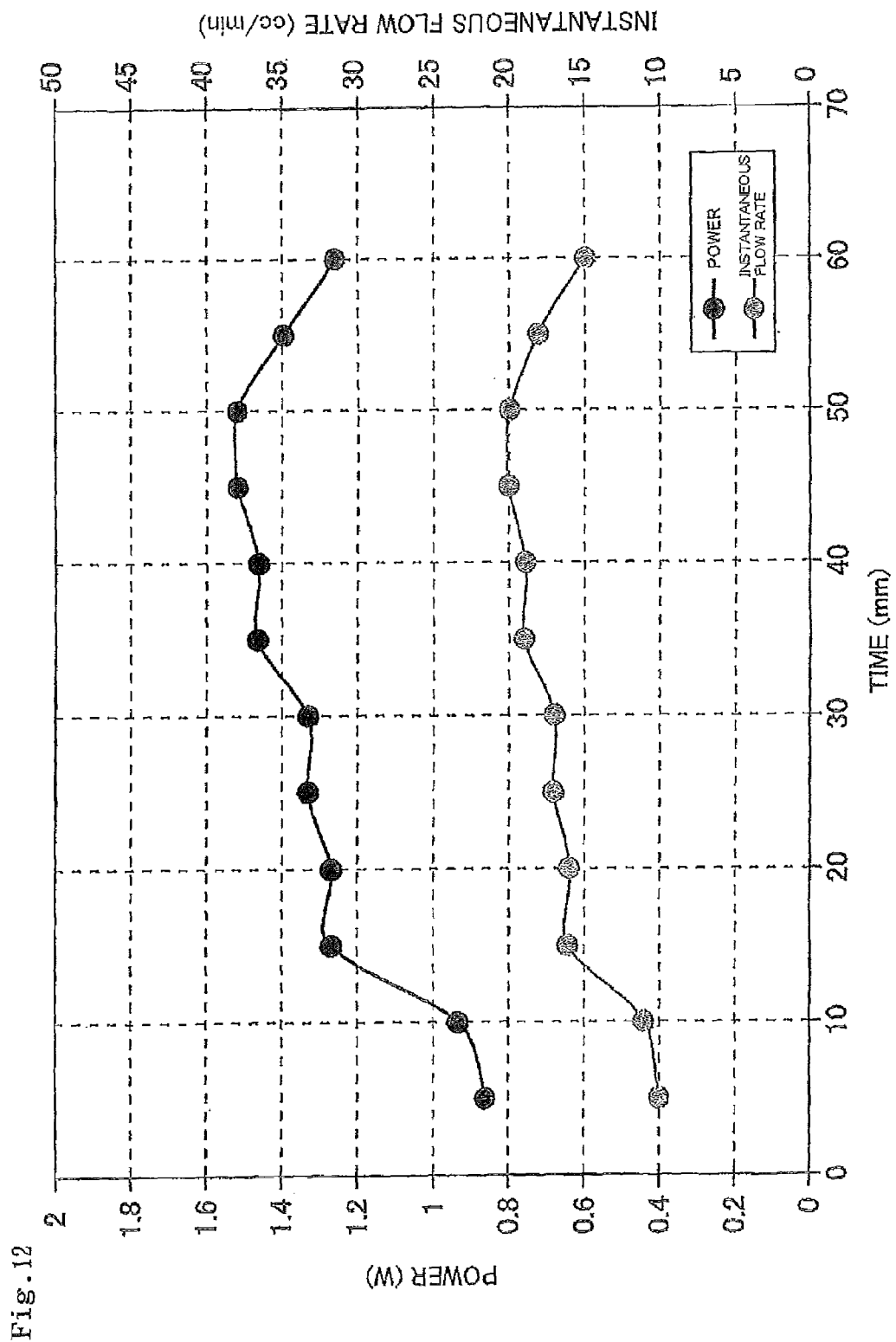
FIG. 12 is a graph showing experimental results.

FIGS. 11 and 12 each shows experimental results when the fuel cell illustrated in FIG. 10 was used to perform the generation of hydrogen and power generation. It has been understood from the results that hydrogen is generated at a substantially constant rate from the sheet-form hydrogen generator, wherein the water absorptive sheet is used, and an electric power output which corresponds to the instantaneous generation amount thereof is gained. Conditions for the experiment are as follows:

In a stirring machine, an epoxy resin and a hydrogen generating agent ($CaH_2$) were mixed with each other at a ratio by weight of the epoxy resin to the $CaH_2$=1:1 (at 2000 rpm for 1 minute and 2200 rpm for 1 minute). A filter paper piece was laid on the bottom of a sample mold, 30×50×0.5 mm in size, and then a spatula was used to paint the hydrogen-generating-agent-containing resin onto/into the paper piece. Furthermore, another filter paper piece was put onto the hydrogen-generating-agent-containing resin to make the resin and the pieces into a sandwich form. Thereafter, the workpiece was dried at 120° C. for 20 minutes to cure the resin. For finishing, extra portions of the filter paper pieces (filter paper piece portions which did not contact the hydrogen-generating-agent-containing resin) were cut out so as to form a sheet-form hydrogen generator (finish size: 30×50×about 1 mm).

This sheet-form hydrogen generator and the same generator were used, and put into the container of the fuel generating section. Water was supplied thereinto in an amount of 1 mL. Immediately thereafter, the container was set to the inner space of the cell holder, and an electron loader was used to measure the output (of the fuel cell) based on the power generation thereof. At the time, the hydrogen generation amount was measured with a mass flow meter.

Different Embodiment

The fuel cell according to the present invention may be used as a main power source for driving an electronic instrument; however, the fuel cell may be used also as a charging instrument for charging a secondary battery held in an electronic instrument. The fuel cell may be used as, for example, a charging instrument for charging a lithium batter or any other secondary battery held in a portable instrument such as a portable telephone.

In the inner space of the cell holder 6, the pressure in the inside becomes high since chemical reaction for generating hydrogen is caused. When the pressure turns more than a predetermined value in this case, a danger is caused; thus, it is preferred to set a mechanism for releasing the pressure. For example, it is preferred to set a safety valve. The safety valve may have a simple structure wherein a slit is made in a rubbery bush. In this case, the slit is close when the pressure is normal. However, when the pressure becomes high, hydrogen can be released from the slit. The slit is urged in the slit-gap-closing direction by the elastic force of the rubber.

The number of the power generating cells C to be held by the cell holder 6 may be appropriately varied. For example, the cell holder 6 can hold eight power generating cells C when the length thereof is doubled.

Figure 13:
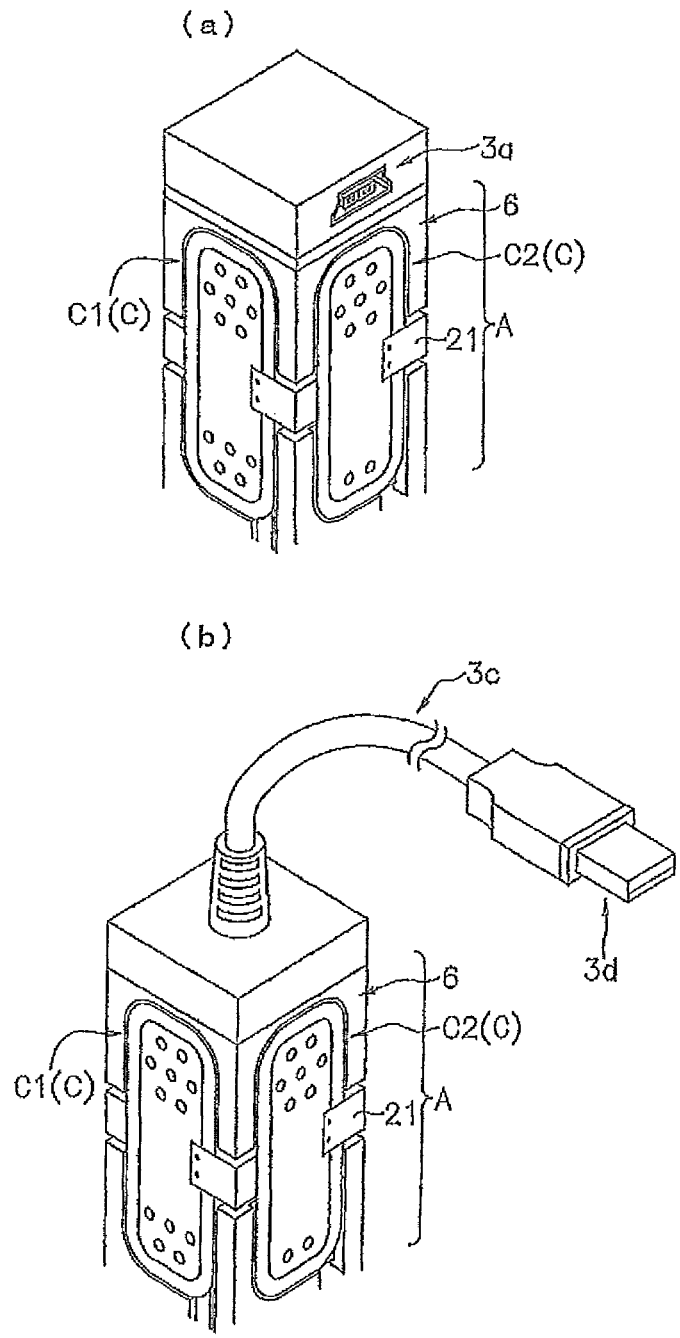
FIG. 13 Figures are views illustrating different embodiments of an electric power supply region.

The structure of the region for supplying electric power is not limited to the electric power supply terminal 3 illustrated in the present embodiment. The structure may be, for example, a modified example illustrated in each of FIG. 13. FIG. 13(*a*) illustrates an example wherein an electric power supply terminal 3*a* in the form of a female mold is set as the electric power supply section. When the electric power supply terminal 3*a* is set to the other end side of the cell holder 6, the direction in which a cord is connected thereto may not be in a direction along the long axis of the cell holder 6 as in the present embodiment. Thus, a cord may be connected thereto from a side face as illustrated in FIG. 13(*a*). FIG. 13(*b*) illustrates an example wherein a cord 3*c* is bonded to the body of the fuel cell so as to be integrated therewith. An electric power supply terminal 3*d* is fitted to the tip of the cord 3*c*. Also when the cord 3*c* is integrated therewith, the direction in which the cord 3*c* is pulled out may be a direction extending from a side face as illustrated in FIG. 13(*a*).

Third Embodiment

In each of the first and second embodiments, shown has been an example wherein the finished power generating cells C are used to be integrated with the cell holder 6. However, it is allowable to use constituting members of the power generating cells C to be integrated therewith in such a manner that each of the power generating cells C is held to face one of its two surfaces inward, whereby the cell holder 6 or a partial region of the cell holder 6 is formed to be combined with the power generating cells C to form the inner space. In other words, in the fuel cell of the embodiment, constituting members of power generating cells C are equipped with the power generating cells C integrated with a cell holder 6 by insert molding.

FIG. 14 is views illustrating an example of power generating cells C held by a cell holder 6, and FIGS. 14(*a*) and 14(*b*) are a top view thereof and a sectional view thereof, respectively. For the convenience of description, FIG. 14 illustrates only any one of the power generating cells C1 to C4 illustrated in FIG. 1(*a*), which is a power generating cell C.

In the same manner as in FIG. 10, the cell holder 6 holds each of the power generating cells C1 to C4 to face one (at the anode side) of its two surfaces inward, whereby the cell holder is combined with the power generating cells C1 to C4 to form an inner space. The cell holder 6 may hold a single power generating cell C. The cell holder 6 may be combined with members other than the power generating cell C to form the inner space. In the same manner as in FIG. 1, a plurality of power generating cells C1 to C4 may be arranged therein.

Figure 15:
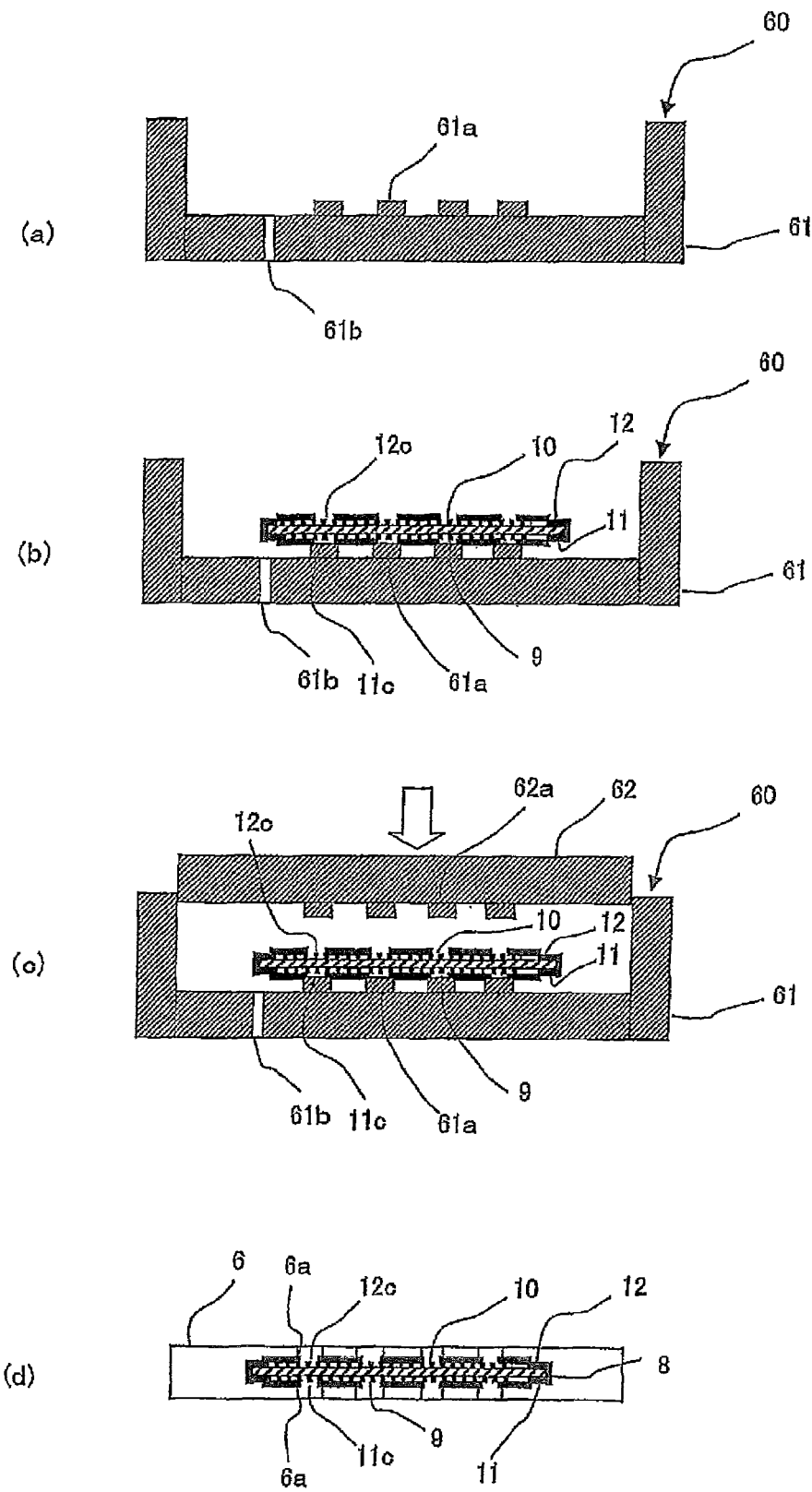
FIG. 15 Figures are sectional views illustrating a method for manufacturing the fuel cell (third embodiment) when steps of the method are viewed from the front.

With reference to FIG. 15, a method for forming the cell holder 6 will be described: As illustrated in FIGS. 15(*a*) to 15(*d*), a fuel cell manufacturing method of the present invention includes the step of arranging, in a mold 60, the power generating cell C or constituting members thereof in the state that at least openings 11*c* and 12*c* in the surfaces are stuffed with convex portions 61*a* and 62*a* of the mold 60, respectively, and the step of injecting a resin into the mold 60 to mold the resin into the cell holder 6. In the embodiment, shown is an example wherein: the constituting members of the power generating cell C are used; and further the mold 60 is divided into a first mold member 61 and a second mold member 62, and therebetween the power generating cell C can be sandwiched from both sides thereof.

For example, as illustrated in FIG. 15(*a*), prepared is first the first mold member 61, which has, in the bottom surface thereof, the convex portions 61*a*. The convex portions 61*a* are located at positions corresponding to openings 11*c* in the anode side metallic plate 11 of the power generating cell C, and are portions with which the openings 11*c* are stuffed in order to make uncovering open regions 6*a* in the cell holder 6. The convex portions 61*a* are each in a columnar form, and the upper surfaces thereof are each somewhat larger than each of the openings 11*c*. The first mold member 61 has, around the bottom surface thereof, side walls. The second mold member 62 can be inserted along the inner surfaces of the side walls.

An injecting port 61*b* is made in the first mold member 61 (or the second mold member 62). However, a plurality of injecting ports 61*b* may be made. In order to make the fluidity of the resin good when the resin is molded, one or more small discharging ports for the resin may be made.

In order to make electrode members 22 and 23 naked from the resin after the molding, the side walls of the first mold member 61 are made into a divided structure (not illustrated). The first mold member 61 has a structure wherein at the time of arranging the power generating cells C1 to C4 in the mold 60, the electrode members 22 and 23 are positioned at rectangular notches located in the divided side walls of the lower mold member as the first mold member 61, and the electrode members 22 and 23 are pushed by means of the upper mold member. In this manner, the electrode members 22 and 23 can be made naked from the resin.

For example, as illustrated in FIG. 15(*b*), next, the four power generating cells C connected electrically to each other through jointing members 21 are arranged on the bottom surface of the first mold member 61. At the time, the power generating cells C are arranged at positions where the openings 11*c* in the anode side metallic plate 11 can be stuffed with the upper surfaces of the convex portions 61*a* in the bottom surface.

For example, as illustrated in FIG. 15(*c*), next, the second mold member 62 is inserted into the first mold member 61 along the inner surfaces of the side walls of the member 61. Convex portions 62*a* are located in the lower surface of the second mold member 62. The convex portions 62*a* are located at positions opposed to the openings 12*c* in the cathode side metallic plate 12 of the power generating cell C. The convex portions 62*a* are portions with which the openings 12*c* are stuffed in order to make uncovering open regions 6*a* in the cell holder 6. The convex portions 62*a* are each in a columnar form, and the upper surfaces thereof are each somewhat larger than each of the openings 12*c*. In the state that the metallic plates 11 and 12 are pressured by the convex portions 61*a* of the first mold member 61 and the convex portions 62a of the second mold member 62, the power generating cell C is arranged in the mold 60.

In this state, a resin is injected into the mold 60. However, the openings 11c and 12c are stuffed with the convex portions 61a and the convex portions 62a, respectively; thus, as illustrated in FIG. 15(*d*), in the resultant molded body, the anode side electrode plate 9 and the cathode side electrode plate 10 are naked from the uncovering open regions 6a. The injection of the resin makes it possible to seal up the entire circumference of the power generating cell C.

Fourth Embodiment

As illustrated in FIG. 17, a single metallic plate (joint member 21) wherein an anode metallic plate 11 and a cathode side metallic plate 12 are continuous with each other is used to make it possible to connect power generating cells C1 to C4 to each other. For the convenience of description, FIG. 16 each illustrates only any one of the four power generating cells C1 to C4, which is a power generating cell C.

As illustrated in FIG. 16, a fuel cell according to the fourth embodiment is equipped with a solid polymer electrolyte 8, an anode side electrode plate 9 and a cathode side electrode plate 10 arranged on both sides of this solid polymer electrolyte 8, respectively, and an anode side metallic plate 11 and a cathode side metallic plate 12 arranged outside the electrode plates 9 and 10, respectively, and having openings 11c and 12c for making the anode side electrode plate 9 and the cathode side electrode plate 10, respectively, partially uncovered.

The solid polymer electrolyte 8 may be substantially the same as in the first embodiment. The anode side electrode plate 9 and the cathode side electrode plate 10 may also be substantially the same as in the first embodiment.

In the present embodiment, however, the outer circumferences of the anode side electrode plate 9 and the cathode side electrode plate 10, and the outer circumference of the solid polymer electrolyte 8 are sealed up with a resin. Thus, a fuel gas and others neither flow inward nor outward from the outer circumferences of the electrode plates 9 and 10; it is therefore unnecessary to make the external form of the solid polymer electrolyte 8 larger than the external forms of the electrode plates 9 and 10, or use another electrical insulator.

In the embodiment, the outer circumferences of the anode side metallic plate 11 and the cathode side metallic plate 12 are formed inside those of the anode side electrode plate 9 and the cathode side electrode plate 10. By the formation of the outer circumferences of the metallic plates 11 and 12 inside those of the electrode plates 9 and 10, the outer circumferences of the electrode plates 9 and 10 and the outer circumference of the solid polymer electrolyte 8 can be sealed up with a higher certainty.

Additionally, a short circuit can also be prevented between the anode side metallic plate 11 and the cathode side metallic plate 12 since the outer circumferences of the anode side metallic plate 11 and the cathode side metallic plate 12 are sealed with the resin.

As illustrated in FIG. 17(*a*), the four power generating cells C are electrically connected to each other in series. The joint members 21 in the embodiment each have a shape as illustrated in FIG. 17(*b*); by subjecting a thin metallic plate to press working, the plate is molded into a product wherein the anode side metallic plate 11 of one of any adjacent two of the power generating cells C is integrated with the cathode side metallic plate 12 of the other. As illustrated in FIG. 17(*a*), this makes it possible to connect the cathode side metallic plate 12 of the power generating cell C1 electrically to the anode side metallic plate 11 of the power generating cell C2. In the same way, the power generating cells C2 and C3 adjacent to each other are connected to each other, as well as the power generating cells C3 and C4.

The metallic plates 11 and 12 are each at least partially made naked from the resin, whereby the naked portions are used as electrode members 22 and 23 to lead electricity to the outside. For this reason, terminal regions where the metallic plates 11 and 12 are each partially made naked may be located in the sealing resin. In the embodiment, however, shown is an example wherein the anode side metallic plate 11 of the power generating cell C1 and the cathode side metallic plate 12 of the power generating cell C4 have projection regions which are to be the electrode members 22 and 23, respectively, and these regions project from the sealing resin to the outside.

Figure 18:
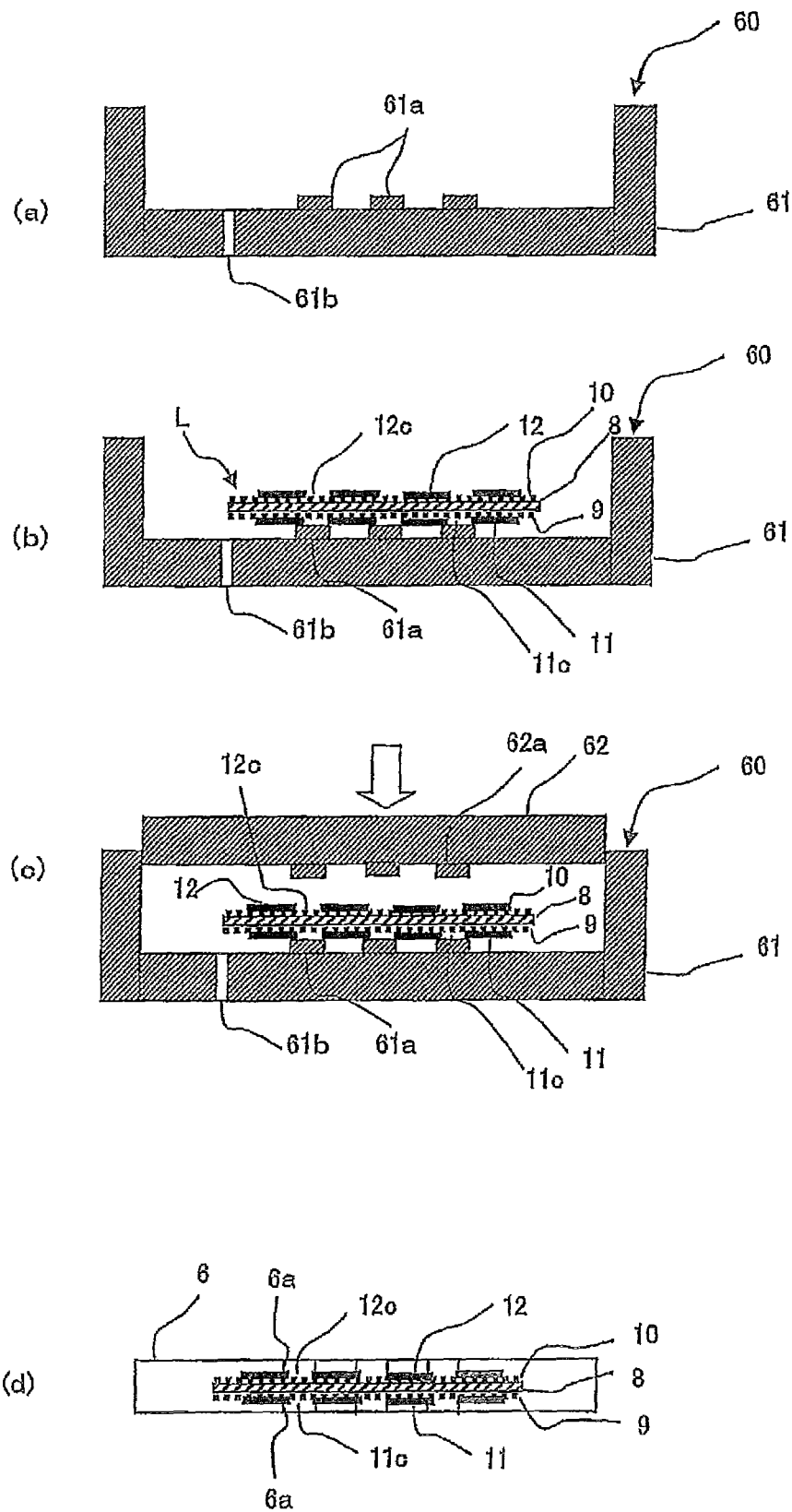
FIG. 18 Figures are sectional views illustrating a method for manufacturing the fuel cell (fourth embodiment) when steps of the method are viewed from the front.

In the invention, the size of the openings 11c and 12c in the metallic plates 11 and 12 may be larger or smaller than that of the uncovering open regions 6a of the resin, or may be equal thereto. Preferably, the size of the openings 11c and 12c in the metallic plates 11 and 12 is smaller than that of the uncovering open regions 6a of the resin in order to seal the elements of the cell C with the resin in the state that the anode side metallic plate 11 and the cathode side metallic plate 12 are pressured from both the sides, whereby the elements of the cell C are integrated with each other. This makes it possible to make use of portions of the resin which correspond to the uncovering open regions 6a to pressure the metallic plates 11 and 12 around the openings 11c and 12c when the resin is molded (see FIG. 18(*c*)). In other words, it is preferred to seal the elements of the cell C with the resin so as to be integrated with each other in the state that the anode side metallic plate 11 and the cathode side metallic plate 12 are pressured from both the sides. The sealing with the resin in such a pressured state makes the pressure large which is applied when the metallic plates 11 and 12 on both the sides contact the electrode plates 9 and 10, respectively, so that the cell resistance decreases. Thus, the power of the cell is improved.

When the size of the uncovering open regions 6a of the resin is made smaller than that of the openings 11c and 12c, portions (for example, the circumferences) of the electrode plate 9 and 10 that are naked from the openings 11c and 12c are sealed with the resin; thus, the respective adhesive properties between the electrode plates 9 and 10 and the metallic plates 11 and 12 can be made high. In the case, it is impossible to make use of portions of the resin which correspond to the uncovering open regions 6a to pressure the metallic plates 11 and 12 around the openings 11c and 12c when the resin is molded. However, by pressuring portions of the metallic plates 11 and 12 other than the openings 11c and 12c therein by use of, for example, separate pins at the time of the molding, the members of the cell C can be sealed with the resin in the state that the anode side metallic plate 11 and the cathode side metallic plate 12 are pressured from both the sides.

The material of the resin may be substantially the same as in the first embodiment. The thickness of the whole of the resin is preferably from 0.3 to 4 mm, more preferably from 0.5 to 2 mm from the viewpoint of the strength for the integration by the resin sealing, the pressure for pressuring the metallic plates 11 and 12, a decrease in the thickness of the fuel cell, and others. In particular, the thickness of the resin region that covers each of the metallic plates 11 and 12 is preferably from 0.2 to 1.5 mm, more preferably from 0.3 to 1.0 mm from the viewpoint of the pressure for pressuring the metallic plates 11 and 12.

The fuel cell according to the fourth embodiment may be manufactured by substantially the same method as in the third embodiment. Specifically, as illustrated in FIGS. 18(a) to 18(d), a method for manufacturing the fuel cell according to the fourth embodiment includes the step of arranging, in a mold 60, a lamination L composed of a solid polymer electrolyte 8, electrode plates 9 and 10 arranged on both sides thereof, and metallic plates 11 and 12 arranged outside the electrode plates, respectively. The fuel cell manufacturing method according to the fourth embodiment also includes the step of injecting a resin into the mold 60 to seal at least the outer circumferences of the electrode plates 9 and 10 and the outer circumference of the solid polymer electrolyte 8 therewith, so as to make the anode side electrode plate 9 and the cathode side electrode plate 10 naked from uncovering open regions 6a, thereby integrating these members with the anode side metallic plate 11 and the cathode side metallic plate 12. Hereinafter, steps different from the steps of the third embodiment will be described. The other steps are the same as in the first embodiment.

As illustrated in FIG. 18(b), the lamination L is arranged onto the bottom surface of a first mold member 61. At the time, the lamination L is arranged at such a position that the upper surfaces of its convex portions 61a can cover openings 11c in the anode side metallic plate 11. When the lamination L is arranged, the individual layers thereof may be partially or wholly made into one unit. When the layers are not partially made into one unit, the layers may be separately or simultaneously arranged.

The invention claimed is:

1. A fuel cell, comprising:
 a plurality of power generating cells, which each have at least two surfaces, a fuel gas being supplied through a first surface and oxygen being supplied through a second surface, thereby generating electric power,
 a cell holder that holds each of the plurality of power generating cells to face the first surface inward, whereby forming an inner space together with the plurality of power generating cells with each first surface facing toward the middle of the inner space,
 a fuel generating section that is arranged in the inner space of the cell holder, and stores a hydrogen generating agent that is reactive with a reaction liquid containing water to generate hydrogen gas, and
 an ammonia removing agent for removing ammonia from hydrogen gas.

2. The fuel cell according to claim 1, wherein in the state that the power generating cells are electrically connected to each other, the cells are integrated with the cell holder by insert molding.

3. The fuel cell according to claim 1, wherein the cell holder forms a cylindrical side wall together with the power generating cells, and the power generating cells are arranged on the circumference of the cylindrical side wall.

4. The fuel cell according to claim 1, wherein in the fuel generating section, the hydrogen generating agent is stored in a container having a porous cylindrical side wall to interpose a hydrophobic porous membrane between the container and the hydrogen generating agent.

5. The fuel cell according to claim 4, wherein when the container of the fuel generating section is arranged in the inner space of the cell holder, the container can be removably disposed in the inner space.

6. The fuel cell according to claim 1, wherein the cell holder forms a flat boxy body together with the power generating cell(s), which has at least two opposing surfaces, and the power generating cells are arranged on one or both surfaces of the opposing surfaces of the boxy body.

* * * * *